US006919064B2

(12) United States Patent
Resasco et al.

(10) Patent No.: US 6,919,064 B2
(45) Date of Patent: Jul. 19, 2005

(54) PROCESS AND APPARATUS FOR PRODUCING SINGLE-WALLED CARBON NANOTUBES

(75) Inventors: Daniel E. Resasco, Norman, OK (US); Boonyarach Kitiyanan, Pantunwan (TH); Walter E. Alvarez, Norman, OK (US); Leandro Balzano, Norman, OK (US)

(73) Assignee: The Board of Regents of the University of Oklahoma

( * ) Notice: Subject to any disclaimer, the term of this patent is extended or adjusted under 35 U.S.C. 154(b) by 345 days.

(21) Appl. No.: 09/996,142

(22) Filed: Nov. 28, 2001

(65) Prior Publication Data

US 2005/0042162 A1 Feb. 24, 2005

Related U.S. Application Data

(63) Continuation-in-part of application No. 09/587,257, filed on Jun. 2, 2000, now Pat. No. 6,413,487.
(60) Provisional application No. 60/253,877, filed on Nov. 29, 2000.

(51) Int. Cl.[7] .................................................. D01F 9/12

(52) U.S. Cl. ................................................... 423/447.3

(58) Field of Search ..................................... 423/447.3

(56) References Cited

U.S. PATENT DOCUMENTS

| 3,746,657 | A | | 7/1973 | Miller et al. | |
| 4,456,694 | A | | 6/1984 | Blaskie et al. | |
| 4,574,120 | A | | 3/1986 | Thompson | |
| 4,663,230 | A | | 5/1987 | Tennent ....................... | 428/367 |
| 5,165,909 | A | | 11/1992 | Tennent et al. ............. | 423/447 |
| 5,227,038 | A | | 7/1993 | Smalley et al. ............. | 204/173 |
| 5,300,203 | A | | 4/1994 | Smalley ....................... | 204/157 |
| 5,405,996 | A | | 4/1995 | Suzuki et al. | |
| 5,482,601 | A | | 1/1996 | Ohshima et al. ............. | 204/173 |
| 5,543,378 | A | | 8/1996 | Wang ........................... | 502/174 |
| 5,556,517 | A | | 9/1996 | Smalley ....................... | 204/157 |
| 5,560,898 | A | | 10/1996 | Uchida et al. ............... | 423/461 |
| 5,578,543 | A | | 11/1996 | Tennent et al. ............. | 502/180 |
| 5,587,141 | A | | 12/1996 | Ohshima et al. ............. | 423/461 |
| 5,591,312 | A | | 1/1997 | Smalley ....................... | 204/157 |
| 5,603,907 | A | | 2/1997 | Grochowski ................ | 423/210 |
| 5,641,466 | A | | 6/1997 | Ebbesen et al. ............. | 423/447 |
| 5,648,056 | A | | 7/1997 | Tanaka ......................... | 423/445 |
| 5,695,734 | A | | 12/1997 | Ikazaki et al. ............... | 423/461 |
| 5,698,175 | A | | 12/1997 | Hiura et al. ................. | 423/447 |
| 5,707,916 | A | | 1/1998 | Snyder et al. ............... | 502/416 |
| 5,744,235 | A | | 4/1998 | Creehan ....................... | 428/364 |
| 5,753,088 | A | | 5/1998 | Olk .............................. | 204/173 |
| 5,773,834 | A | | 6/1998 | Yamamoto et al. ......... | 204/192 |
| 5,780,101 | A | | 7/1998 | Nolan et al. ................. | 427/216 |
| 5,814,290 | A | | 9/1998 | Niu et al. ..................... | 423/344 |
| 5,877,110 | A | | 3/1999 | Snyder et al. ............... | 502/180 |
| 5,965,267 | A | | 10/1999 | Nolan et al. ................. | 428/408 |
| 5,985,232 | A | | 11/1999 | Howard et al. ............. | 423/447 |
| 5,997,832 | A | | 12/1999 | Lieber et al. ................ | 423/249 |
| 6,401,526 | B1 | * | 6/2002 | Dai et al. ..................... | 73/105 |
| 6,413,487 | B1 | * | 7/2002 | Resasco et al. ........... | 423/447.3 |
| 2001/0031900 | A1 | | 10/2001 | Margrave et al. | |
| 2002/0127169 | A1 | | 9/2002 | Smalley et al. | |
| 2002/0165091 | A1 | | 11/2002 | Resasco et al. | |

FOREIGN PATENT DOCUMENTS

| EP | 0 945 402 A1 | 9/1999 |
| EP | 01 93 9821 | 6/2004 |
| JP | 406122489 | 5/1994 |
| WO | 9709272 | 3/1997 |
| WO | 98392550 | 9/1998 |
| WO | 9842620 | 10/1998 |
| WO | WO 00/17102 | 3/2000 |
| WO | WO 00/73205 | 12/2000 |
| WO | PCT/US02/23155 | 7/2003 |

OTHER PUBLICATIONS

Tahji et al. 'Purification Procedure for Single–Walled Nanotubes' in J. Phys. Chem. B vol. 101 pp. 1974–1978, 1997, no month.*
Dai et al., 'Single–wall nanotubes produced by metal–catalyzed disproportionation of carbon monoxide' in Chemical Physics Letters vol. 260 pp 471–475, Sep. 1996.*
Alvarez, et al., "Synergism of Co and Mo in the catalytic production of single–wall carbon nanotubes by decomposition of CO", Elsevier Science Ltd., Carbon 39 (2001), pp. 547–558.
Bandow et al., "Effect of the Growth Temperature on the Diameter Distribution and Chirality of Single–Wall Carbon Nanotubes", The American Physical Society, Physical Review Letters, vol. 80, No. 17, (1998), pp. 3779–3782.
Chaturvedi et al., "Properties of pure and sulfided NiMoO4 and CoMoO4 catalysts: TPR, XANES and time–resolved XRD studies", Database Accession No. EIX99044490981 XP002246342, Proceedings of the 1997 Mrs Fall Symposium, Boston, MA, USA, Dec. 2–4, 1997; Mater Res Soc Symp Proc, Materials Research Society Symposium–Proceedings, Recent Advances in Catalytic Materials, 1998, Mrs. Warrendale, PA, USA.

(Continued)

Primary Examiner—Stuart Hendrickson
(74) Attorney, Agent, or Firm—Dunlap, Codding & Rogers, P.C.

(57) ABSTRACT

A process and apparatus for catalytic production of single walled carbon nanotubes. Catalytic particles are exposed to different process conditions at successive stages wherein the catalytic particles do not come in contact with reactive (catalytic) gases until preferred process conditions have been attained, thereby controlling the quantity and form of carbon nanotubes produced. The reaction gas is preferably provided at a high space velocity to minimize $CO_2$ build-up. The process also contemplates processes and apparatus which recycle and reuse the gases and catalytic particulate materials, thereby maximizing cost efficiency, reducing wastes, reducing the need for additional raw materials, and producing the carbon nanotubes, especially SWNTs, in greater quantities and for lower costs.

37 Claims, 10 Drawing Sheets

OTHER PUBLICATIONS

De Boer et al., "The cobalt–molybdenum interaction in CoMo/SiO$_2$ catalysts: A CO–oxidation study", *Elsevier Science Ltd.,* Solid State Ionics 63–65 (1993), pp. 736–742.

Bethune et al.; "Cobalt–Catalysed Growth of Carbon Nanotubes with Single–Atomic–Layer Walls," *Nature,* 363:605–607, Jun. 1993.

V. Brotons et al., "Catalytic influence of bimetallic phases for the synthesis of single–walled carbon nanotubes", Journal of Molecular Catalysis, A: Chemical 116 (1997) 397–403.

Cassell et al., "Large Scale CVD Synthesis of Single–Walled Carbon Nanotubes", American Chemical Society, pp. 6483–6492, 1999.

Che et al., "Chemical Vapor Deposition Based Synthesis of Carbon Nanotubes and Nanofibers Using a Template Method", Chemical Mater. 1998, 10, pp. 260–267.

Chen et al., "Growth of carbon nanotubes by catalytic decompositon of CH4 or CO on a Ni–MgO catalyst", CARBON vol. 35, No. 10–11, pp. 1495–1501, 1997.

Cheng et al.; "Bulk Morphology and Diameter Distribution of Single–Walled Carbon Nanotubes Synthesized by Catalytic Decomposition of Hydrocarbons", Chemical Physics Letters, 289:602–610, 1998.

Cheng et al.; "Large–Scale and Low–Cost Synthesis of Single–Walled Carbon Nanotubes by the Catalytic Pyrolysis of Hydrocarbons," Applied Physics Letters, 72(25) : 3282–3284, Jun. 25, 1998.

Dai et al.; "Single–Wall Nanotubes Produced By Metal–Catalyzed Disproportionation of Carbon Monoxide" Chemical Physics Letters, 260:471–475, 1996.

Database, Accession No. 1999–366878, Cano, "Canno KK", XP–002149235, May 25, 1999.

Fonseca et al., "Synthesis of single–and multi–wall carbon nanotubes over supported catalysts", Applied Physics A, 67, pp. 11–22, 1998.

PCT/US00/15362, International Search Report.

Govindaraj et al., "Carbon structures obtained by the disproportionation of carbon monoxide over nickel catalysts", Materials Research Bulletin, vol. 33, No. 4, pp. 663–667, 1998.

Hafner et al., "Catalytic growth of single–wall carbon nanotubes from metal particles", Chemical Physics Letters, 296, PP 195–202, 1998.

Hernadi et al., "Catalytic synthesis of carbon nanotubes using zeolite support", Elsevier Science Inc. 1996.

Hyperion Catalysis International Website; http://www.fibrils.com/esd.htm ; "Unique Slough Resistant SR™ Series ESD Thermoplastic Product Line Offers Reduced Particle Contamination For Demanding Electronic Applications," and Hyperion Homepage http://www.fibrils.com.

Iijima, Sumio; "Helical Microtubules of Graphitic Carbon," Nature, 354:56–58, Nov. 1991.

IIjima et al.; "Single–Shell Carbon Nanotubes of 1–nm Diameter", Nature 363:603–605, Jun. 1993.

Ivanov et al.; "The Study of Carbon Nanotubes Produced by Catalytic Method," Chemical Physics Lettersm 223:329–335, 1994.

Journet et al.; "Large–Scale Production of Single–Walled Carbon Nanotubes by the Electric–Arc Technique," Nature, 338:756–758, Aug. 1997.

B. Kitiyanan et al., "Controlled production of single–wall carbon nanotubes by catalytic decomposition of CO on bimetallic Co–Mo catlaysts", Chemical Physics Letters, 317 (2000), pp. 497–503, Feb. 4, 2000.

Krishnankutty et al.; "The Effect of Copper on the Structural Characteristics of Carbon Filaments Produced from Iron Catalyzed Decomposition of Ethylene," Catalysts Today, 37:295–307, 1997.

Li et al., "Large–Scale Synthesis of Aligned Carbon Nanotubes", SCIENCE, vol. 274, pp. 1701–1703.

Rinzler et al.; "Large–Scale Purification of Single–Wall Carbon Nanotubes: Process, Product, and Characterization," Applied Physics A, 67:29–37, 1998.

Thess et al., Crystalline Ropes of Metallic Carbon Nanotubes, SCIENCE, vol. 273, pp. 483–487.

I. Willems et al., "Control of the outer diameter of thin carbon nanotubes synthesized by catalytic decomposition of hydrocarbons", Chemical Physics Letters, 317 (2000) pp. 71–76.

Yakobson et al.; "Fullerene Nanotubes: $C_{1,000,000}$ and Beyond," *American Scientist,* 85:324–337, Jul.–Aug. 1997.

Patent Abstracts of Japan, vol. 1996, No. 12, Dec. 26, 1996, & JP 08 198611 A (NEC Corp), Aug. 6, 1996, Abstract.

* cited by examiner

PROCESS AND APPARATUS FOR PRODUCING SINGLE-WALLED CARBON NANOTUBES

RELATED REFERENCES

This is a continuation-in-part of U.S. Ser. No. 09/587,257 filed Jun. 2, 2000, now U.S. Pat. No. 6,413,487. The present application also claims the benefit of the filing date of U.S. Provisional Application 60/253,877, filed Nov. 29, 2000. The specification of each of the above is hereby expressly incorporated herein by reference in its entirety.

STATEMENT REGARDING FEDERALLY SPONSORED RESEARCH OR DEVELOPMENT

This invention was supported by NSF Grant CTS-9726465, the U.S. Government has certain rights herein.

BACKGROUND OF THE INVENTION

This invention is related to the field of producing carbon nanotubes, and more particularly, but not by way of limitation, to processes and apparatus for producing single-walled carbon nanotubes. The specification of each of U.S. Ser. No. 09/587,257, U.S. Provisional Application 60/253,877, and U.S. Ser. No. 09/389,593 have subject matter which is relevant to the present invention and each is hereby expressly incorporated herein by reference in its entirety.

Carbon nanotubes (also referred to as carbon fibrils) are seamless tubes of graphite sheets with full fullerene caps which were first discovered as multilayer concentric tubes or multi-walled carbon nanotubes and subsequently as single-walled carbon nanotubes in the presence of transition metal catalysts. Carbon nanotubes have shown promising applications including nanoscale electronic devices, high strength materials, electron field emission, tips for scanning probe microscopy, and gas storage.

Generally, single-walled carbon nanotubes are preferred over multi-walled carbon nanotubes for use in these applications because they have fewer defects and are therefore stronger and more conductive than multi-walled carbon nanotubes of similar diameter. Defects are less likely to occur in single-walled carbon nanotubes than in multi-walled carbon nanotubes because multi-walled carbon nanotubes can survive occasional defects by forming bridges between unsaturated carbon valances, while single-walled carbon nanotubes have no neighboring walls to compensate for defects.

However, the availability of these new single-walled carbon nanotubes in quantities necessary for practical technology is still problematic. Large scale processes for the production of high quality single-walled carbon nanotubes are still needed.

Presently, there are three main approaches for synthesis of carbon nanotubes. These include the laser ablation of carbon (Thess, A. et al., Science, 273:483, 1996), the electric arc discharge of graphite rod (Journet, C. et al., Nature, 388:756, 1997), and the chemical vapor deposition of hydrocarbons (Ivanov, V. et al., Chem. Phys. Lett, 223:329, 1994; Li A. et al., Science, 274:1701, 1996). The production of multi-walled carbon nanotubes by catalytic hydrocarbon cracking is now on a commercial scale (U.S. Pat. No. 5,578,543) while the production of single-walled carbon nanotubes is still in a gram scale by laser (Rinzler, A.G. et al., Appl. Phys. A. 67:29, 1998) and arc (Journet, C. et al., Nature, 388:756, 1997) techniques.

Unlike the laser and arc techniques, carbon vapor deposition over transition metal catalysts tends to create multi-walled carbon nanotubes as a primary product instead of single-walled carbon nanotubes. However, there has been some success in producing single-walled carbon nanotubes from the catalytic hydrocarbon cracking process. Dai et al. (Dai, H. et al., Chem. Phys. Lett, 260:471 1996) demonstrate web-like singlewalled carbon nanotubes resulting from disproportionation of carbon monoxide (CO) with a molybdenum (Mo) catalyst supported on alumina heated to 120° C. From the reported electron microscope images, the Mo metal obviously attaches to nanotubes at their tips. The reported diameter of single-walled carbon nanotubes generally varies from 1 nm to 5 nm and seems to be controlled by the Mo particle size. Catalysts containing iron, cobalt or nickel have been used at temperatures between 850° C. to 1200° C. to form multi-walled carbon nanotubes (U.S. Pat. No. 4,663,230). Recently, rope-like bundles of single-walled carbon nanotubes were generated from the thermal cracking of benzene with iron catalyst and sulfur additive at temperatures between 1100–1200° C. (Cheng, H.M. et al., Appl. Phys. Lett., 72:3282, 1998; Cheng, H. M. et al., Chem. Phys. Lett., 289:602, 1998). The synthesized single-walled carbon nanotubes are roughly aligned in bundles and woven together similarly to those obtained from laser vaporization or electric arc method. The use of laser targets comprising one or more Group VI or Group VIII transition metals to form single-walled carbon nanotubes has been proposed (WO98/39250). The use of metal catalysts comprising iron and at least one element chosen from Group V (V, Nb and Ta), VI (Cr, Mo and W), VII (Mn, Tc and Re) or the lanthanides has also been proposed (U.S. Pat. No. 5,707, 916). However, methods using these catalysts have not been shown to produce quantities of nanotubes having a high ratio of single-walled carbon nanotubes to multi-walled carbon nanotubes. Moreover, metal catalysts are an expensive component of the production process.

In addition, the separation steps which precede or follow the reaction step represent a large portion of the capital and operating costs required for the production of the carbon nanotubes. Therefore, the purification of single-walled carbon nanotubes from multi-walled carbon nanotubes and contaminants (i.e., amorphous and graphitic carbon) may be substantially more time consuming and expensive than the actual production of the carbon nanotubes.

Therefore, new and improved methods of producing nanotubes which enable synthesis of bulk quantities of substantially pure single-walled carbon nanotubes at reduced costs are sought. It is to such methods and apparatus for producing nanotubes that the present invention is directed.

SUMMARY OF THE INVENTION

According to the present invention, a process and apparatus for producing carbon nanotubes is provided which avoids the defects and disadvantages of the prior art. Broadly, the process includes contacting, in a reactor cell, metallic catalytic particles with an effective amount of a carbon-containing gas at a temperature sufficient to catalytically produce carbon nanotubes, wherein a substantial portion of the carbon nanotubes are single-walled.

Further, the invention contemplates a process wherein the catalytic particles are exposed to different process conditions at successive stages, wherein the catalytic particles do not come in contact with reactive (catalytic) gases until preferred process conditions have been attained, thereby controlling the quantity and form of carbon nanotubes produced. The process also contemplates methods and apparatus which recycle and reuse the gases and catalytic particulate materials, thereby maximizing cost efficiency, reducing wastes, reducing the need for additional raw materials, and producing the carbon nanotubes, especially single walled carbon nanotubes, in greater quantities and for lower costs.

Other objects, features and advantages of the present invention will become apparent from the following detailed description when read in conjunction with the accompanying figures and appended claims.

DESCRIPTION OF DRAWINGS

FIG. 6 is a graphic representation of calculated equilibrium conversions of the Boudouard Reaction, in a continuous reactor operating at constant pressure and with pure CO in the feed, as a function of the total pressure for different temperatures in the range of 600° C. to 1200° C.

DETAILED DESCRIPTION OF THE INVENTION

Figure 1:
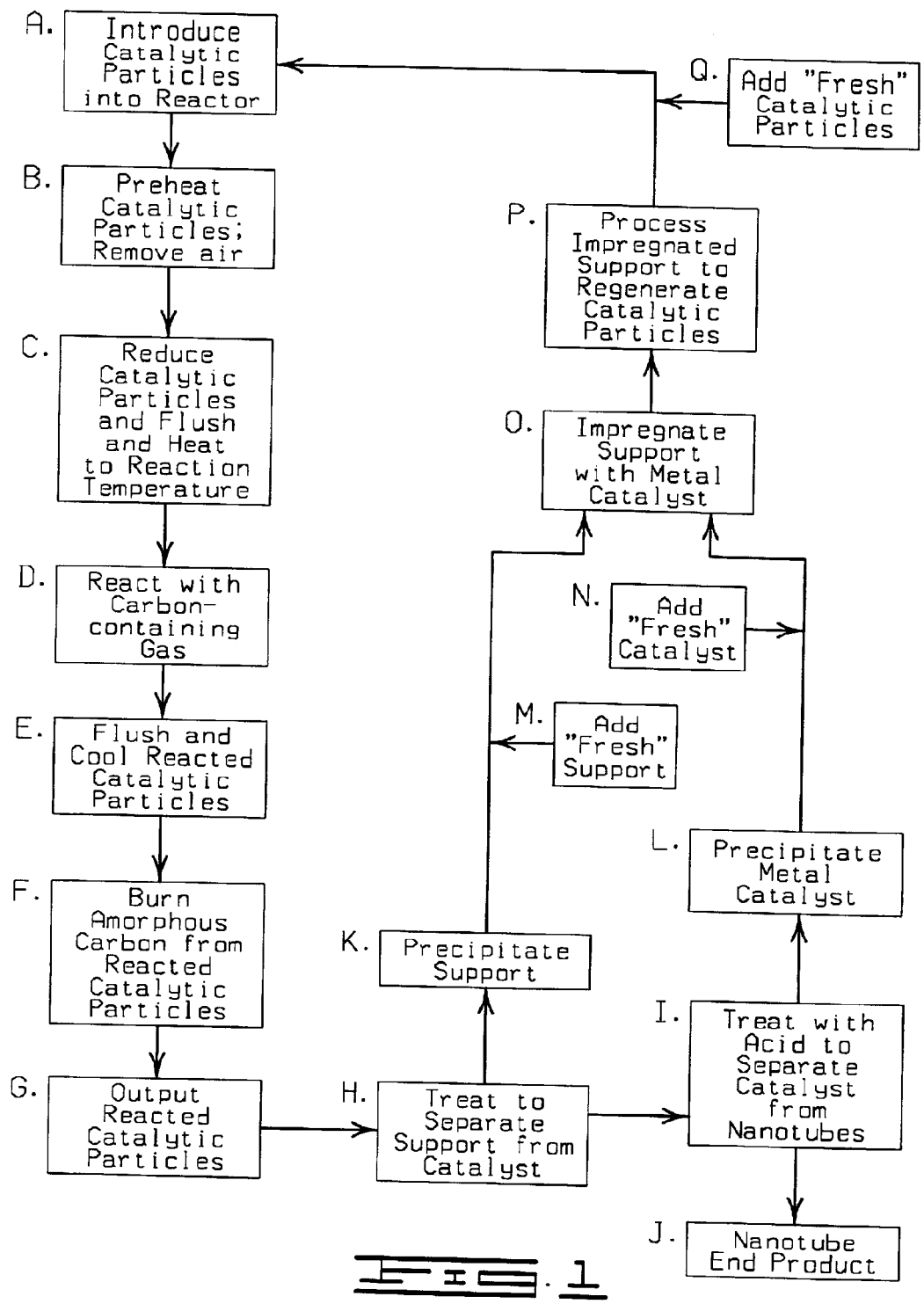
FIG. 1 is a flowchart showing the process steps of one embodiment of the present invention.

A preferred embodiment of a process contemplated by the invention described herein is characterized by the schematic flowchart shown in FIG. 1. The process shown in FIG. 1 is but one embodiment of the present invention and as such it is to be understood that the present invention is not limited to this example or to other examples shown herein.

FIG. 1 shows a series of process steps A–Q which represent a process of continuous catalytic production of carbon nanotubes. In Step A, a quantity of catalytic particles is introduced into a reactor, such as but not limited to, the reactor 10 described elsewhere herein in detail and shown in FIGS. 2 and 3. The catalytic particles can be any particle comprising a catalyst effective in forming carbon nanotubes. Especially preferred embodiments of the catalytic particles are described elsewhere herein, but it will be understood that the present invention is not to be limited only to the types of catalytic particles explicitly described herein. In any event, the catalytic particles generally comprise a solid support material which first has been impregnated with a metallic catalyst (i.e., a transition metal precursor), then calcined, then preferably processed into a pellet form. The pelletization process can be performed either before or after the support material is impregnated with the catalyst (transition metal precursor).

The present process is especially designed for the production of single-walled carbon nanotubes (SWNTs) because in the present process the reaction conditions (e.g., temperature and duration of exposure to reaction conditions) to which the catalytic particles are exposed are highly controlled at different stages. The ability to regulate temperature and reactive concentrations is important to obtain the high selectivity necessary to produce SWNTs. In the process described herein, these problems have been solved by subdividing the process and the reactor in which the process steps occur into different stages so that the catalytic particles are not contacted with the reactive gas (e.g., CO) until the optimal reaction conditions have been achieved. For example, the yield of nanotubes is affected by the catalyst formulation (e.g., transition metal ratio, type of support, and metal loading), by the operating parameters (e.g., reaction temperature, catalytic gas pressure, space velocity and reaction time), and by pretreatment conditions (e.g., reduction and calcination).

After the catalytic particles have been introduced into the reactor, Step B is carried out in which the catalytic particles are treated with a heated inert gas, e.g., He, under high pressure, which functions both to preheat the catalytic particles to a high temperature, such as 700° C. for example, and to remove air from the catalytic particles in preparation for the subsequent reduction step. In Step C, the catalytic particles are exposed to a reducing gas such as $H_2$ at 500° C. under high pressure which reduces, at least partially, the catalyst within the catalytic particles to prepare it for catalysis, and the reducing gas is flushed from the catalytic particles by an inert gas such as He heated to 750° C. under high pressure, for example, which also reheats the catalytic particles for the next step. Where used herein, the term "high pressure" or "elevated pressure" is intended to generally represent a pressure in the range of from about 1 atm to about 40 atm, where a pressure of about 6 atm is preferred. Other elevated pressure levels may be used in other versions of the invention contemplated herein.

Step D follows Step C and is the reaction step in which an effective amount of a carbon-containing gas such as CO is heated to a suitable reaction temperature, such as 750° C., and is exposed to the reduced catalytic particles under high pressure. It is during this stage of the process that carbon nanotubes and amorphous carbon are formed on the, catalytic particles. Note that before the catalytic particles have been exposed to the carbon-containing gas, the reducing gas, e.g., $H_2$, has been flushed from the flow of catalytic particles by the reheating gas, e.g., an inert gas such as He under high pressure.

After Step D, the catalytic particles are subjected to a Step E in which the reacted catalytic particles are exposed to a heated post reaction gas under high pressure, such as He heated to 750° C., for example, which functions to flush the carbon-containing gas remaining from the previous Step D. Then the flushed catalytic particles are cooled with a cooling gas such as He or other inert gas under high pressure at a lower temperature, such as 300° C. or lower. After the reacted catalytic particles have been cooled, they are subjected to Step F wherein they are exposed to a stream of a heated oxidative gas such as $O_2$ at 300° C. under high pressure, for example, wherein the amorphous carbon particles are burned away from the catalytic particles, substantially leaving only carbon nanotubes in the catalytic particles. In Step G, the oxidized catalytic particles are then removed from the reactor for further processing. In Step H, the catalytic particles are subjected to a purification process which results in the separation of the catalyst (which bears the nanotubes) from the support. In a preferred process, the support, such as $SiO_2$, is dissolved by treatment with a base, such as NaOH, at a concentration of 0.1–1.0 Molar, at a preferred temperature of from about 22° C. to about 70° C. and with vigorous stirring, sonication or any other appropriate method known to those of ordinary skill in the art. Alternatively, the support may be soluble in an acid rather than a base, for example, a MgO support, alumina support, or $ZrO_2$ support. Such supports will be dissolved by treatment with an acid, such as HCl, HF, $HNO_3$, aqua regia, or a sulfo-chromic mixture, under similar conditions to that described hereinbefore. Other support materials may require other methods of separation from the catalyst, e.g., using organic solvents such as chloro-compounds, and are also considered to be encompassed by the bounds of the present invention. For example, in an alternative embodiment organic solvents can be used to separate the carbon nanotubes from silica support by extraction after sonication using methods known in the art.

The term "catalyst" where used herein may also be used interchangeably with any of the terms "catalyst material," "metallic catalyst," "metal catalyst," "transition metal" and "transition metal precursor." The term "support" may be used interchangeably herein with the term "support material" or "support component."

After the support has been separated from the catalyst, the catalyst is further treated in Step I by exposure to strong acid (e.g., 0.1 M to 9 M), thereby causing dissolution of the catalyst and separation of the catalyst from the nanotubes, thereby yielding a purified form of the carbon nanotubes in Step J. The carbon nanotubes can then be further processed to yield carbon nanotubes having a greater purity.

A key aspect of the present invention is to recycle and reuse the support material and catalyst material to improve the economy of the nanotube production process. Reuse of the metal catalyst is important because the metal catalyst is one of the most expensive components of the entire process. The support is recovered in Step K by precipitation from solution obtained during Step H, wherein precipitation of the support occurs by neutralization of the solvent (i.e., base or acid). "Fresh" support can be added in Step M to the support precipitated in Step K to make up for support material lost during the process.

Similarly, the metal catalyst is recovered in Step L by precipitation from solution when the acid (or other dissolution solution) is neutralized. "Fresh" catalyst can be added in Step N to catalyst recovered in Step L to make up for catalyst material lost during the previous steps of the process.

The precipitated support and catalyst materials from Steps K and L, including the fresh support and catalyst materials added in Steps M and N, are combined in Step O wherein the support material and catalyst are treated using methods well known to those of ordinary skill in the art to cause the support material to be impregnated with the catalyst. The impregnated support is then calcined and pelletized in Step P, again using methods well known in the art, to form the catalytic particles to be fed into the reactor. If desired, in Step Q, additional "fresh" catalytic particles can be added at this stage and combined with the catalytic particles from Step P, which together are then fed into the reactor, thereby completing the process of the present invention. Steps O and P can be modified in any manner which is effective in regenerating the catalytic particles for use in the reactor.

Benefits and advantages of the carbon nanotube production process contemplated herein are numerous. The process as contemplated herein can be adjusted to maximize the production of SWNTs due to the fact that the process conditions and parameters can be highly controlled. The process is economical because the process is continuous (although it may be processed in a "batch") and because materials and gases used in the process are recovered and recycled. Recycling reduces the amount of waste product as well as the amount of raw materials initially required, thereby reducing the overall cost of the process. The process results in the catalytic particles being exposed to each gaseous phase for a minimum duration, thereby maintaining a more constant reactant concentration (e.g., minimizing $CO_2$ buildup) which is favorable for obtaining a homogenous nanotube product. The process contemplated herein further enables use of high gas flow rates, thereby minimizing the external diffusional effects and maximizing the heat transfer rate. As noted earlier, the solid phase (catalytic particles) retention time can be adjusted independent of the gas phases. This enables the process and apparatus contemplated herein to be used with a wide range of catalysts with different activities. Further, the process is independent of the reaction yield, and the division into separate stages and steps allows different thermal treatments to be used. These factors enable optimization of the gas high space velocity. Additionally, as noted, initial purification of the product can be done within the reactor (the oxidation or "combustion" step).

In general, the process for producing single-walled carbon nanotubes comprises contacting catalytic particles with an effective amount of a carbon-containing gas heated to a temperature of from about 500° C. to about 1200° C., preferably from about 600° C. to about 1000° C., and more preferably from about 650° C. to about 950° C., and more preferably from about 750° C. to about 850° C.

The phrase "an effective amount of a carbon-containing gas" as used herein means a gaseous carbon species present in sufficient amounts to result in deposition of carbon on the catalytic particles at elevated temperatures, such as those described herein, resulting in formation of carbon nanotubes.

As noted elsewhere herein, the catalytic particles as described herein include a catalyst preferably deposited upon a support material. The catalyst as provided and employed in the present invention is preferably bimetallic and in an especially preferred version contains at least one metal from Group VIII, which includes Co, Ni, Ru, Rh, Pd, Ir, Pt, and at least one metal from Group VIb, which includes Cr, W, and Mo or from Group Vb, which includes V, Nb, and Ta. Specific examples of bimetallic catalysts which may be employed by the present invention include Co—Cr, Co—W, Co—Mo, Co—Nb, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Ir—Mo, Pt—Cr, Pt—W, and Pt—Mo. Especially preferred catalysts of the present invention include Co—Mo, Co—W, Ni—Mo and Ni—W. The catalyst may comprise more than one of the metals from each group.

A synergism exists between the two metal components of a bimetallic catalyst in that metallic catalytic particles containing a bimetallic catalyst are much more effective catalysts for the production of single-walled carbon nanotubes than metallic catalytic particles containing either a Group VIII metal, a Group VIb metal, or a Group Vb metal alone as the catalyst.

The ratio of the Group VIII metal to the Group VIb or Group Vb metal in the metallic catalytic particles where a bimetallic catalyst is used may also affect the selective production of single-walled carbon nanotubes. The ratio of the Group VIII metal to the Group VIb or Group Vb metal in a bimetallic catalyst is preferably from about 1:10 to about 15:1, and more preferably about 1:5 to about 2:1. Preferably, the concentration of the Group VIb or Group Vb metal (e.g., Mo) will exceed the concentration of the Group VIII metal (e.g., Co) in metallic catalytic particles employed for the selective production of single-walled carbon nanotubes.

The metallic catalytic particles may comprise more than one metal from each of Groups VIII and VIb or Vb. For example, the metallic catalytic particles may comprise (1) more than one Group VIII metal and a single Group VIb or Group Vb metal, (2) a single Group VIII metal and more than one Group VIb or Group Vb metal, or (3) more than one Group VIII metal and more than one Group VIb or Group Vb metal, and in a preferred version excludes Fe.

The catalyst particles may be prepared by simply impregnating the support with the solutions containing the transition metal precursors. The catalyst can also be formed in situ through decomposition of a precursor compound such as bis (cyclopentadienyl) cobalt or bis (cyclopentadienyl) molybdenum chloride.

The catalyst is preferably deposited on a support such as silica ($SiO_2$), MCM-41 (Mobil Crystalline Material-41), alumina ($Al_2O_3$), MgO, Mg(Al)O (aluminum-stabilized magnesium oxide), $ZrO_2$, molecular sieve zeolites, or other oxidic supports known in the art.

The metallic catalytic particle, that is, the catalyst deposited on the support, may be prepared by evaporating the metal mixtures over flat substrates such as quartz, glass, silicon, and oxidized silicon surfaces in a manner well known to persons of ordinary skill in the art.

The total amount of bimetallic catalyst deposited on the support may vary widely, but is generally in an amount of from about 1% to about 20% of the total weight of the metallic catalytic particle, and more preferably from about 3% to about 10% by weight of the metallic catalytic particle.

In an alternative version of the invention, the bimetallic catalyst may not be deposited on a support, in which case the metal components comprise substantially 100% of the metallic catalytic particle.

Examples of suitable carbon-containing gases which may be used herein include aliphatic hydrocarbons, both saturated and unsaturated, such as methane, ethane, propane, butane, hexane, ethylene and propylene; carbon monoxide; oxygenated hydrocarbons such as acetone, acetylene and methanol; aromatic hydrocarbons such as toluene, benzene and naphthalene; and mixtures of the above, for example carbon monoxide and methane. Use of acetylene promotes formation of multi-walled carbon nanotubes, while CO and methane are preferred feed gases for formation of single-walled carbon nanotubes. The carbon-containing gas may optionally be mixed with a diluent gas, such as helium, argon or hydrogen.

In an especially preferred embodiment of the process claimed herein, the catalytic particle formulation is a Co—Mo/silica support catalyst, with a Co:Mo molar ratio of about 1:2 to about 1:3 to about 1:4. Monometallic Co catalysts or those with a higher Co:Mo ratio tend to result in low selectivity for SWNTs with significant production of defective multi-walled nanotubes and graphite. In the temperature range investigated, without Co, Mo alone is essentially inactive for nanotube production. The catalytic particles are pre-treated with a heated inert gas at a high temperature, such as He at about 700° C., and then treated with a reducing gas, such as hydrogen, at about 500° C. Without the pre-reduction step, or with pre-reduction at higher temperatures (i.e., not enough reduction or too much reduction) the catalyst is not effective and produces fewer SWNTs. Other supports such as alumina may result in a poor Co—Mo interaction, resulting in losses of selectivity and yield.

A high space velocity (above 30,000 $h^{-1}$) is preferred to minimize the concentration of $CO_2$, a by-product of the reaction, which inhibits the conversion to nanotubes. A high CO (or other reactive gas) concentration is preferred to minimize the formation of amorphous carbon deposits which occur at low CO (reactive gas) concentrations. The preferred temperature range is characterized in that below 650° C. the selectivity toward SWNTs is low; and above 1000° C., the conversion is low due to the reversibility of the reaction and the deactivation of the catalyst. Therefore, the optimal temperature is between about 700° C. and about 1000° C.; more preferably between about 750° C. and about 950° C. and even more preferably between about 800° C. and 900° C.

The production process contemplated herein has been designed in such a way to effect a rapid contact of the preferred catalyst formulation with a flow of highly concentrated CO (or other reactive gas) at about 750° C.–950° C. The quality of the SWNTs produced by this process may be determined by a combination of characterization techniques involving Raman Spectroscopy, Temperature Programmed Oxidation (TPO) and Electron Microscopy (TEM).

The preferred methodology therefore comprises contacting a flow of CO gas (or other reactive gas in a high concentration) over the catalytic particles at from about 750° C. to about 950° C. for 1 hour at a high space velocity (above 30,000/$h^{-1}$) under high pressure (above 70 psi).

If the conditions indicated above are followed, a high yield of SWNT (about 20–25 grams of SWNTs per 100 grams of initial catalyst loaded in the reactor) and high selectivity (>90%) is obtained.

Operation

Figure 2:
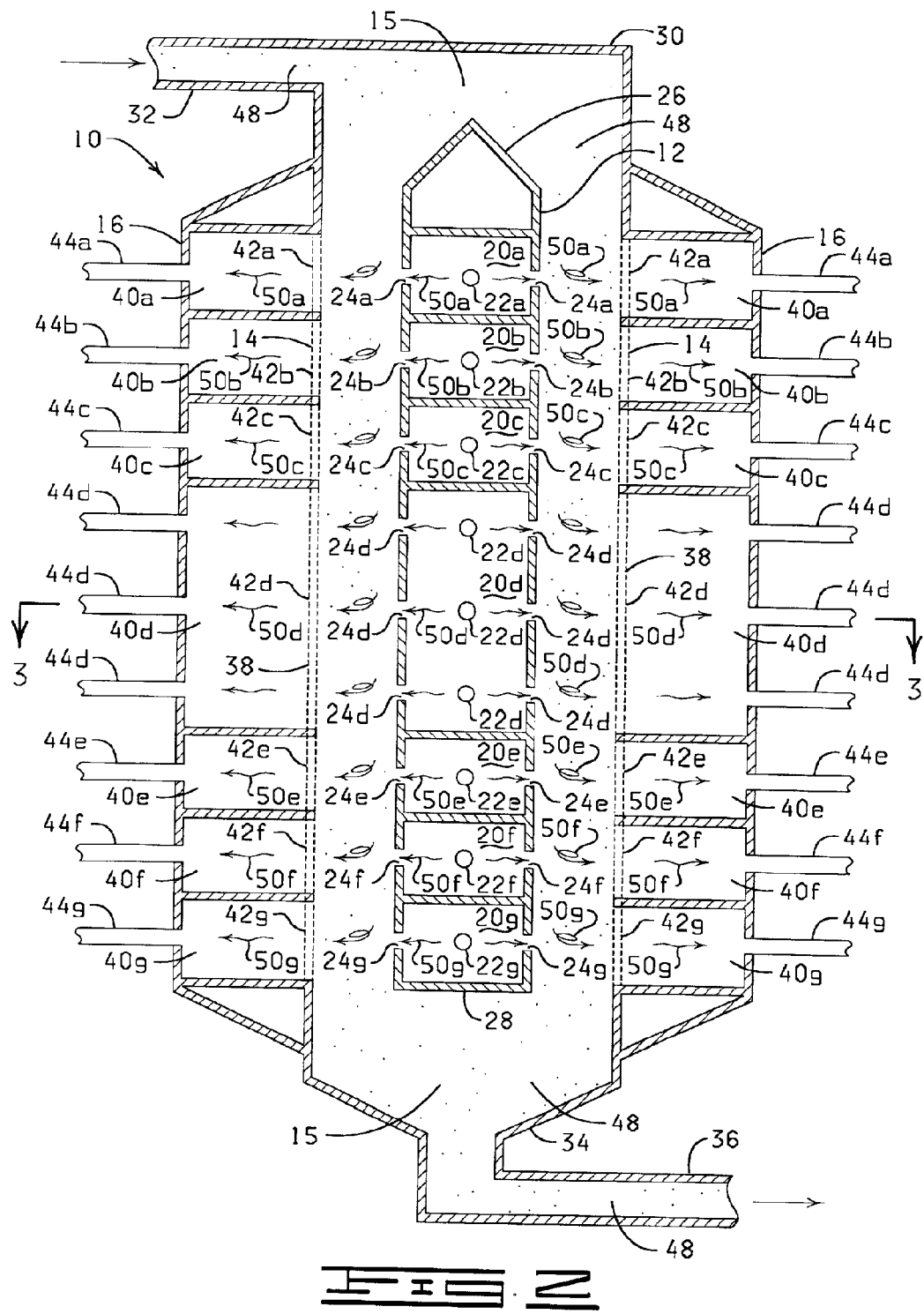
FIG. 2 is a cross-sectional view of a reactor which can be used with the process contemplated as one embodiment of the present invention.
Figure 3:
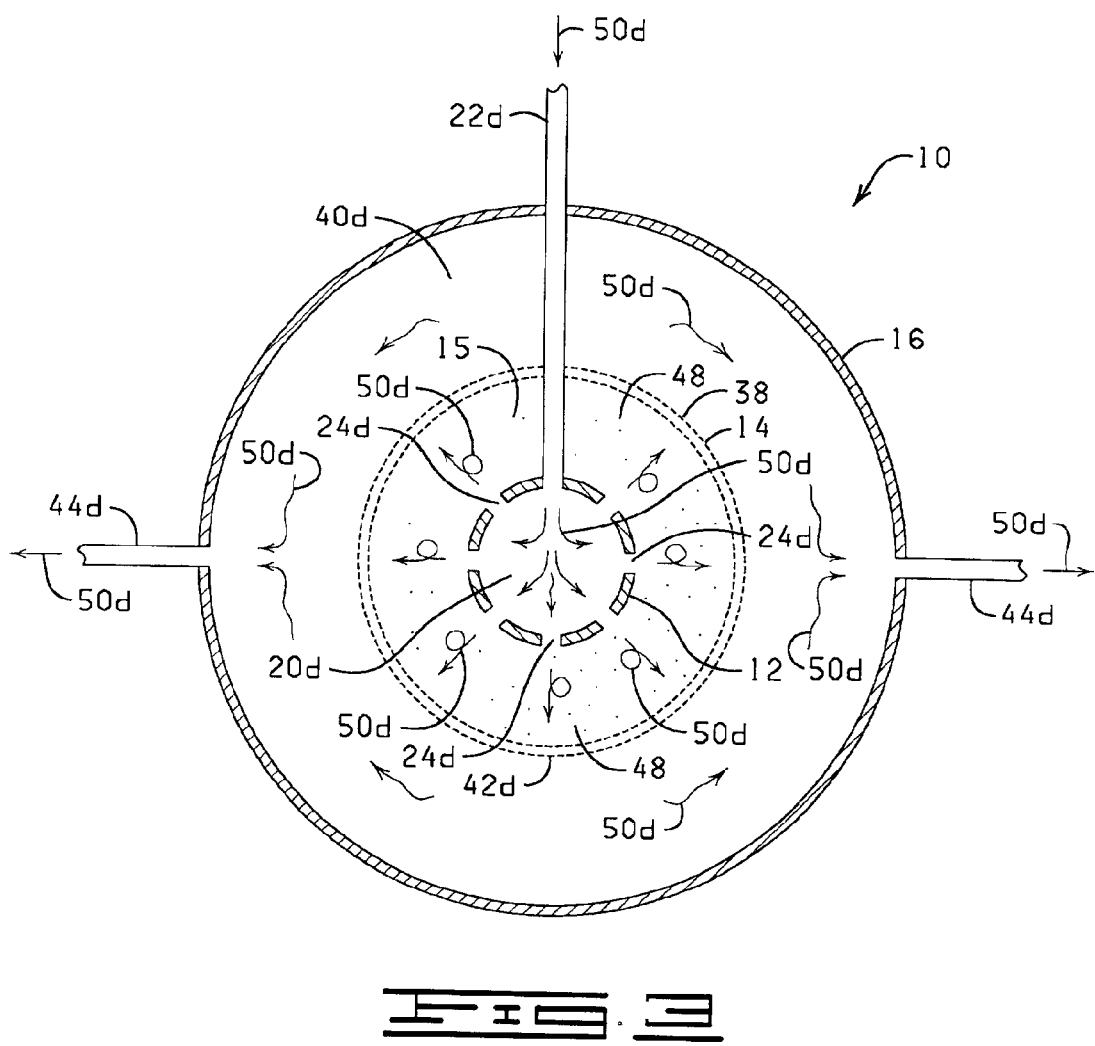
FIG. 3 is a cross-sectional view through line 3—3 of the reactor of FIG. 2.

A preferred embodiment of an apparatus for carrying out the process contemplated herein is shown in FIGS. 2 and 3. The apparatus is a reactor identified by reference numeral 10. The reactor 10 is constructed of three concentric chambers, an inner chamber 12, a middle chamber 14 having an inner space 15 (also referred to herein as a lumen)and an outer chamber 16. The inner chamber 12 is subdivided into a plurality of inlet (gas receiving) chambers including a preheating gas inlet chamber 20a, a reducing gas inlet chamber 20b, a reheating gas inlet chamber 20c, a reaction gas inlet chamber 20d, a post reaction gas inlet chamber 20e, a cooling gas inlet chamber 20f, and a combustion gas inlet chamber 20g. Each gas inlet chamber 20a–20g has at least one corresponding gas inlet, 22a–22g, respectively, and has at least one corresponding gas outlet 24a–24g, respectively. The inner chamber 12 further comprises a closed upper end 26 and a closed lower end 28.

The middle chamber 14 has an upper end 30 (also referred to herein as an input end) which has an input conduit 32 for feeding catalytic particles into the middle chamber 14, and has a lower end 34 (also referred to herein as an output end) which has an output conduit 36 for removing reacted catalytic particles from the reactor 10. The middle chamber 14 is constructed at least partially of a porous material (including, for example, a perforated metal or screen) for forming a porous (or perforated) wall portion 38 of the middle chamber 14. The porous material may be any material which is permeable to gas introduced into the reactor 10 but which is impermeable to catalytic particles introduced into the inner space 15 contained by the middle chamber 14 and which can withstand the operating conditions of the reactor 10. Such materials are known to persons of ordinary skill in the art. The entire reactor 10 must be constructed of materials able to withstand the process conditions to which they are exposed, as will be understood by a person of ordinary skill in the art.

The outer chamber 16 is constructed of a plurality of outlet chambers including a preheating gas outlet chamber 40a, a reducing gas outlet chamber 40b, a reheating gas outlet chamber 40c, a reaction gas outlet chamber 40d, a post reaction gas outlet chamber 40e, a cooling gas outlet chamber 40f, and a combustion gas outlet chamber 40g. Each gas outlet chamber 40a–40g has a porous wall portion 42a–42g, respectively, for receiving gas into each gas outlet chamber 40a–40g, and has at least one corresponding gas outlet 44a–44g, respectively, through which gas is eliminated from each corresponding outlet chamber 40a–40g, respectively.

Each gas outlet chamber 40a–40g is positioned across from each gas inlet chamber 20a–20g such that gas leaving each gas inlet chamber 20a–20g under high pressure passes across the porous wall portions 42a–42g, respectively, and into each gas outlet chamber 40a–40g, respectively.

In use, a quantity of catalytic particles 48 are continuously fed into the reactor 10 through the input conduit 32, and into the inner space 15 of the middle chamber 14. An inert preheating gas 50a is introduced under high pressure through gas inlet 22a into the preheating gas inlet chamber 20a and therefrom through gas outlet 24a, whereby the inert preheating gas 50a heats the catalytic particles 48 which are adjacent to the preheating gas inlet chamber 20a to a desired predetermined temperature. The inert preheating gas 50a then passes across the porous wall portion 42a into the preheating gas outlet chamber 40a and out of the preheating gas outlet chamber 40a via gas outlet 44a. In a preferred embodiment, the preheating temperature is about 700° C.–1000° C., but in alternative embodiments the preheating temperature can be in the range of from about 500° C. to about 1200° C.

After the catalytic particles 48 have been heated they are moved into a position adjacent to the reducing gas inlet chamber 20b and are reduced by a heated reducing gas 50b, such as $H_2$, which is introduced under high pressure through gas inlet 22b into the reducing gas inlet chamber 20b and therefrom through gas outlet 24b wherein the heated reducing gas 50b passes across the catalytic particles 48 at a high space velocity (at least 30,000 $h^{-1}$), through the porous wall portion 42b, into the reducing gas outlet chamber 40b, and out of the reducing gas outlet chamber 40b via gas outlet 44b. In a preferred embodiment, the temperature of the heated reducing gas 50b is about 500° C., but in alternative embodiments the temperature of the heated reducing gas 50b may be in the range of from about 400° C. to about 800° C. The heated reducing gas 50b may be $H_2$, $NH_3$, $CH_4$, or mixtures of $NH_3$, $CH_4$, $H_2$ and/or other gases, as long as the heated reducing gas 50b functions in accordance with the present invention. In a preferred embodiment, $H_2$ is utilized as the heated reducing gas 50b.

After the catalytic particles 48 have been reduced by the heated reducing gas 50b, they are moved into a position adjacent to the reheating gas inlet chamber 20c and are reheated after being cooled during reduction by an inert reheating gas 50c, such as He, which is introduced under high pressure through gas inlet 22c into the reheating gas inlet chamber 20c and therefrom through gas outlet 24c, wherein the reheating gas 50c passes across catalytic particles 48 at a high space velocity (at least 30,000 $h^{-1}$), through the porous wall portion 42c, into the reheating gas outlet chamber 40c, and out of the reheating gas outlet chamber 40c via gas outlet 44c. In a preferred embodiment the temperature of the reheating gas 50c is about 750° C.–950° C., but in alternative embodiments the temperature of the reheating gas 50c is in the range of from about 600° C. to about 1200° C. The reheating gas 50c may be He, Ar, $N_2$ or other inert gases or mixtures thereof. Preferably, the reheating gas 50c is He.

After the catalytic particles 48 have been reheated by reheating gas 50c, they are moved into a position adjacent to the reaction gas inlet chamber 20d and are exposed to a heated carbon-containing reaction gas 50d, such as CO, which is introduced under high pressure through gas inlet 22d into the reaction gas inlet chamber 20d and therefrom through gas outlet 24d, wherein the heated carbon-containing reaction gas 50d passes across catalytic particles 48, through the porous wall portion 42d, into the reaction gas outlet chamber 40d, and out of the reaction gas outlet chamber 40d via gas outlet 44d. This stage of the process is shown in detail in FIG. 3. In a preferred embodiment, the temperature of the heated carbon-containing reaction gas 50d is about 750° C., but in alternative embodiments the temperature of the heated carbon-containing reaction gas 50d is in the range of from about 500° C. to about 1200° C. The heated carbon-containing reaction gas 50d may be CO, $CH_4$, $C_2H_4$, or $C_2H_2$ or mixtures thereof, or any carbon-containing gas which functions in accordance with the present invention. In a preferred embodiment, CO is utilized as the carbon-containing gas 50d.

After the catalytic particles 48 have been reacted with the heated carbon-containing reaction gas 50d, they are moved into a position adjacent to the post reaction gas inlet chamber 20e and are flushed of the heated carbon-containing reaction gas 50d while at the reaction temperature by a heated post reaction gas 50e, such as He, which is introduced under high pressure through gas inlet 22e into the post reaction gas inlet chamber 20e and therefrom through gas outlet 24e, wherein the heated post reaction gas 50e passes across catalytic particles 48, through the porous wall portion 42e, into the post reaction gas outlet chamber 40e, and out of the post reaction gas outlet chamber 40e via the gas outlet 44e. In a preferred embodiment, the temperature of the heated post reaction gas 50e is about 750° C., i.e., the same temperature as the heated reaction gas 50d, but in alternative embodiments the temperature of the heated post reaction gas 50e is in the range of from about 300° C. to about 800° C. The post reaction gas 50e may be He, $N_2$, Ar, or any other inert gas or mixtures thereof which function in accordance with the present invention. In a preferred embodiment, the post reaction gas 50e is He.

After the catalytic particles 48 have been cleared of the heated carbon-containing reaction gas 50d by the heated post reaction gas 50e, they are moved into a position adjacent to the cooling gas inlet chamber 20f and are cooled in preparation for combustion of amorphous carbon by the cooling gas 50f, such as He, which is introduced under high pressure through gas inlet 22f into the cooling gas inlet chamber 20f and therefrom through gas outlet 24f, wherein the cooling gas 50f passes across catalytic particles 48, through the porous wall portion 42f, into the cooling gas outlet chamber 40f, and out of the cooling gas outlet chamber 40f via the gas outlet 44f. In a preferred embodiment, the temperature of the cooling gas 50f is considerably lower than the temperature of the post reaction gas 50e, for example about 22° C., but in alternative embodiments the temperature of the cooling gas 50f is in the range of from about 0° C. to about 300° C. Ideally, the temperature of the cooling gas 50f is a moderate temperature sufficient to cool the catalytic particles 48 to a temperature lower than or about equal to that under which the following step will be carried out. The cooling gas 50f may be He, $N_2$, Ar, or other inert gases or mixtures thereof. In a preferred embodiment, the cooling gas 50f is He.

After the catalytic particles 48 have been cooled by cooling gas 50f, they are moved into a position adjacent combustion gas inlet chamber 20g wherein the amorphous carbon residue produced during the reaction step can be burned off in a combustion (oxidation) step (without affecting the nanotubes) by a heated combustion gas 50g containing $O_2$ (at a concentration range of from about 2% to about 5%) which is introduced under high pressure through gas inlet 22g into the combustion gas inlet chamber 20g and therefrom through gas outlet 24g, wherein the heated combustion gas 50g passes across catalytic particles 48, through the porous wall portion 42g, into the combustion gas outlet chamber 40g, and out of the combustion gas outlet chamber 40g via the gas outlet 44g. In a preferred embodiment, the temperature of the heated combustion gas 50g is about 300° C., but in alternative preferred embodiments the temperature of the heated combustion gas 50g is in the range of from about 280° C. to about 320° C. The heated combustion gas 50g may be $O_2$ in a gas mixture, air or an air mixture with He or may be any other gas, as long as the heated combustion gas 50g functions in accordance with the present invention to cause oxidation of the amorphous carbon on the catalytic particles 48. Preferably, the heated combustion gas 50g is 2–5% $O_2$ in a gas mixture.

After the catalytic particles 48 have been subjected to the oxidation process to remove amorphous carbon, they are moved to the lower end 34 of the middle chamber 14 of the reactor 10 and are passed out of the reactor 10 through the output conduit 36 for further purification and processing as explained elsewhere herein.

While the apparatus for inputting, driving, and outputting the catalytic particles 48 into, through, and out of the reactor 10 are not shown, such mechanisms are well known to one of ordinary skill in the art, and may include devices such as slide valves, rotary valves, table feeders, screw feeders, screw conveyors, cone valves and L valves for controlling and driving the flow of catalytic particles 48 into and out of the reactor 10. Therefore, no further explanation of such devices and mechanisms need be required herein. The flow rate of the catalytic particles 48 is controlled independently of gas flow in the reactor 10, and flow rates of each gas 50a–50g, in one embodiment, may not be controlled independently of one another, or in an alternate embodiment may be controlled independently, thereby enabling the process conditions and parameters to be adjusted on an individual basis.

The present invention contemplates that the reactor 10, as shown and described herein, is constructed so as to enable the gases supplied to the reactor 10, such as gases 50a–50g, to be recycled after having been output from the reactor 10. For example, inert preheating gas 50a is collected from gas outlet 44a, purified if necessary, mixed with additional inert preheating gas 50a to replace lost gas, reheated and pressurized, and reintroduced at preheating gas inlet 22a. Similarly, heated reducing gas 50b is collected from gas outlet 44b, purified if necessary, mixed with additional heated reducing gas 50b, reheated and pressurized, and reintroduced at reducing gas inlet 22b. In a similar manner, reheating gas 50c is collected from reheating gas outlet 44c, purified if necessary, mixed with additional reheating gas 50c, reheated and pressurized and reintroduced at reheating gas inlet 22c. Further, heated carbon-containing reaction gas 50d is collected from gas outlet 44d, purified if necessary, mixed with additional heated carbon-containing reaction gas, reheated and pressurized and reintroduced at reaction gas inlet 22d. Similarly, heated post reaction gas 50e is collected from the post reaction gas outlet 44e, purified If necessary, mixed with additional heated post reaction gas 50e, reheated and pressurized and reintroduced at post reaction gas inlet 22e. Cooling gas 50f is collected from cooling gas outlet 44f, purified if necessary, mixed with additional cooling gas 50f, cooled, pressurized and reintroduced at cooling gas inlet 22f. Finally, heated combustion gas 50g is collected from combustion gas outlet 44g, purified to remove combustion products such as $CO_2$, mixed with additional heated combustion gas 50g, reheated and pressurized, and reintroduced at combustion gas inlet 22g. Methods of mixing gases, purifying them, and reheating and repressurizing them are known to persons of ordinary skill in the art, so further discussion herein of such methods is not deemed necessary.

As noted herein, the apparatus shown in FIGS. 2 and 3 and in the portion of the present specification relating thereto describes but one type of apparatus which may be employed to carry out the process contemplated herein. Other apparatuses which may also be used are shown in FIGS. 4 and 5 and are further described below.

Figure 4:
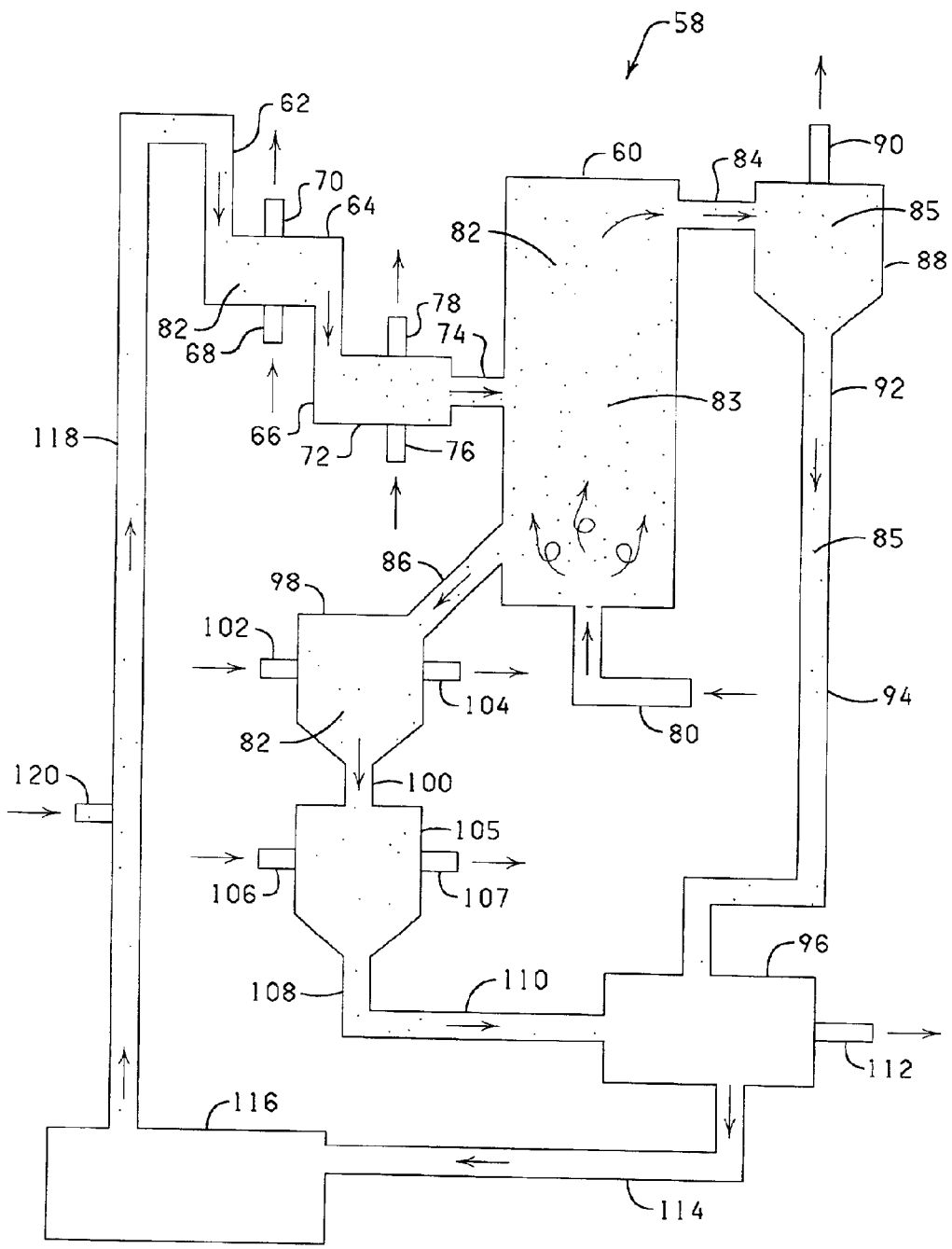
FIG. 4 is a diagrammatic representation of an apparatus which can be used in the process of the present invention.

FIG. 4 shows an apparatus 58 comprising a reactor 60 used as a component in a continuous fluidized bed process. Catalytic particles 82 are fed via an input conduit 62 into a reducing chamber 64 and are reduced in a manner similar to that discussed previously. A reducing gas as discussed previously (such as $H_2$) can be input through a gas inlet 68 and removed through a gas outlet 70. After the reduction step, the catalytic particles 82 can be fed, via any appropriate mechanism, through an output channel 66 into a reheating chamber 72 wherein the catalytic particles 82 are heated to an appropriate reaction temperature via an inert heating gas as discussed previously (such as He) which is introduced into the reheating chamber 72 via a gas inlet 76 and which can be removed via a gas outlet 78. After heating, the catalytic particles 82 are passed via an output channel 74 into the reactor 60 wherein they are subjected to reaction conditions by inputting a carbon-contained gas as discussed previously (such as CO) at a high space velocity via a gas inlet 80, which results in the catalytic particles 82 being maintained as a "fluidized bed" 83 in which the carbon nanotube formation process occurs. Light catalytic particles 85 may be lofted out of the fluidized bed 83 and carried out with an exhaust gas through an exhaust conduit 84 into a light particle trap 88, which filters the light catalytic particles 85 from the exhaust gas, which is eliminated via an exhaust outlet 90. The light catalytic particles 85 are thereby recovered and passed through a trap output 92 via a light particle conduit 94 into a catalytic particle treatment unit 96 for further processing and recycling of the light catalytic particles 85. Meanwhile, the catalytic particles 82 which comprise the fluidized bed 83, after an appropriate exposure to reaction conditions within the reactor 60, are removed from the reactor 60 via a particle output 86 and enter a cooling chamber 98 wherein an inert cooling gas as discussed previously (such as He) provided at a lower temperature is introduced via a gas inlet 102, thereby cooling the reacted catalytic particles 82. The cooling gas is removed via a gas outlet 104. The catalytic particles 82 then leave the cooling chamber 98 via an output conduit 100 and enter an oxidation chamber 105. In the oxidation chamber 105, the catalytic particles 82 are exposed to an oxidative gas as described herein before (such as $O_2$) which enters via a gas inlet 106, the amorphous carbon residue on the catalytic particles 82 being removed in the oxidation chamber 105. Gases are eliminated from the oxidation chamber 105 via a gas outlet 107, and the catalytic particles 82 leave via an output conduit 108 and pass through a particle conduit 110 into the catalytic particle treatment unit 96. In the catalytic particle treatment unit 96, the catalyst is separated from the support component of the catalytic particles 82 and 85, and the carbon nanotubes are separated from the catalyst by processes previously discussed. The carbon nanotubes are output via a product output 112 for additional purification. The catalyst and support components are transferred via a separation output conduit 114 to a catalyst and a support recovery unit 116 wherein the catalyst is recovered, such as by precipitation, for example, and the support is recovered, such as by precipitation, for example, and the catalyst and support are reconstituted in a manner previously described to form catalytic particles 82 which can be reused in the process. The catalytic particles 82 thus recovered are transferred via a feeding conduit 118 back into the reducing chamber 64 for reuse, and may be mixed with fresh catalytic particles 82 which enter via a fresh catalytic particle input 120. As previously explained, the gases used in the apparatus 58 of FIG. 4 are preferably recovered and recycled for use within the apparatus 58.

Figure 5:
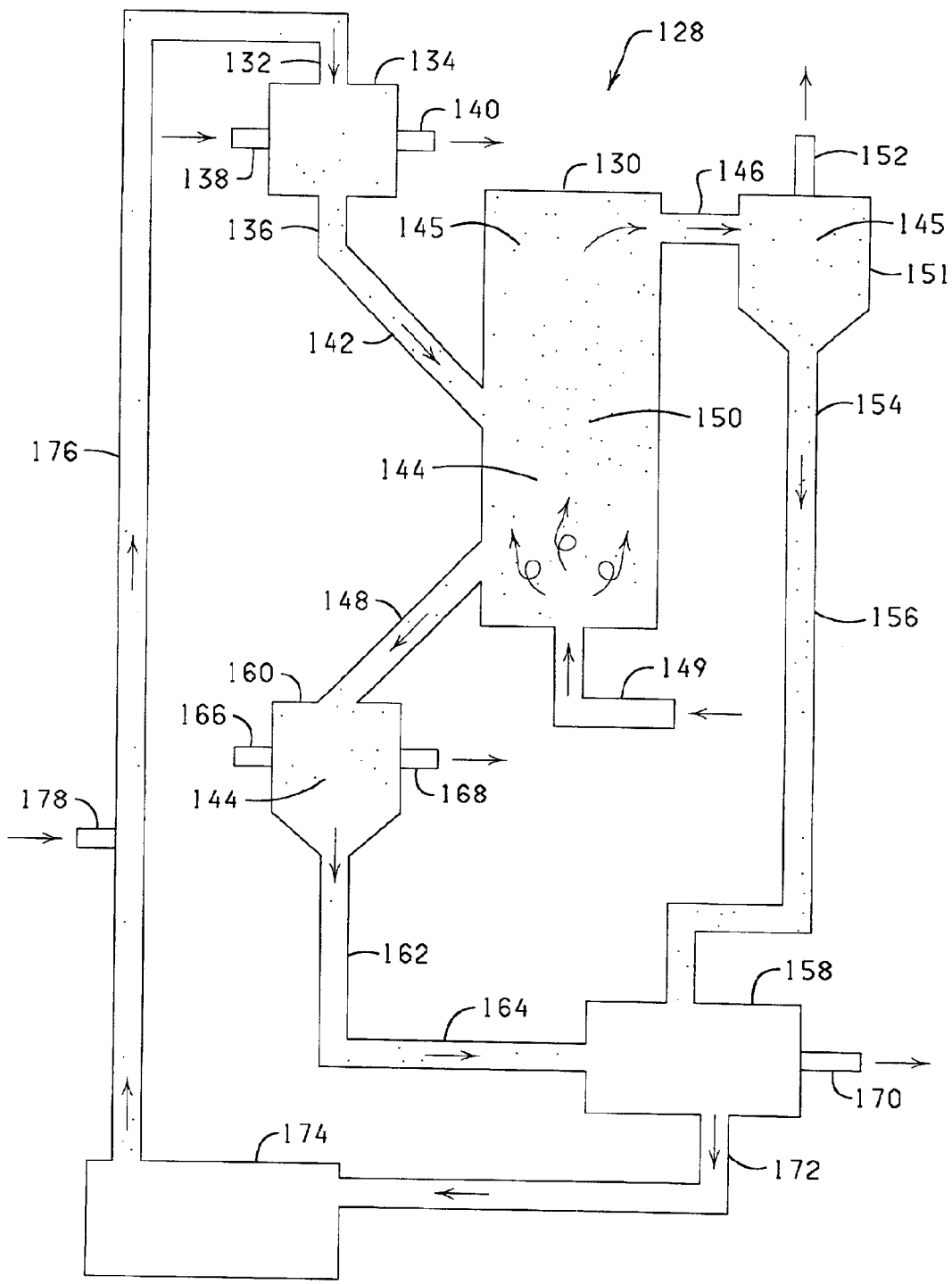
FIG. 5 is a diagrammatic representation of another apparatus which can be used in the process of the present invention
Figure 5:
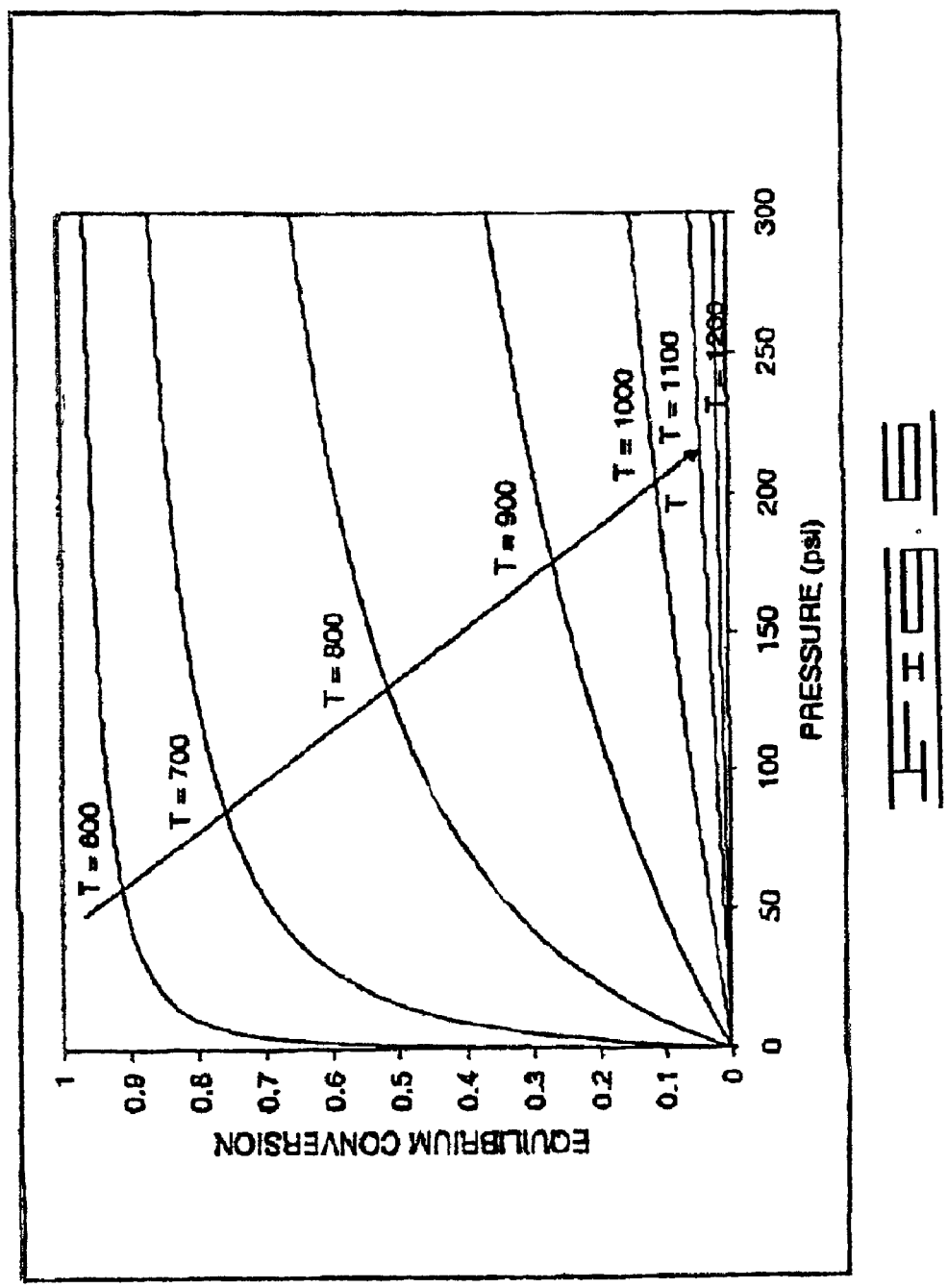

FIG. 5 shows an apparatus 128 which comprises a reactor 130 used as a component in a quasi-continuous batch and fluidized bed process. Portions of the apparatus 128 rely on batch-type processes while portions rely on a fluidized bed-type process, as explained below. Catalytic particles 144 are fed via an input conduit 132 into a reducing/heating chamber 134 wherein the catalytic particles 144 are reduced in a manner similar to that discussed previously except that a batch process is utilized rather than a continuous process. The catalytic particles 144, having been reduced, are then reheated in the same reducing/heating chamber 134 in which they were reduced. The gases used for reducing and heating are introduced via a gas inlet 138 and are removed via a gas outlet 140. The reducing process thereby alternates with the reheating process. After reheating, the catalytic particles 144 pass out of the reducing/heating chamber 134 via output conduit 136 and pass through a reactor input 142 into the reactor 130 where they are exposed to a carbon-containing gas at a high space velocity via a gas inlet 149, thereby forming the catalytic particles 144 into a fluidized bed 150 as described previously for the apparatus 58 of FIG. 4, the carbon nanotube formation process beginning in the fluidized bed 150. As with the fluidized bed process described above, light catalytic particles 145 may be lofted out of the fluidized bed 150 and carried out with exhaust gas through an exhaust conduit 146 into a light particle trap 151 which filters the light catalytic particles 145 from the exhaust gas, which is eliminated via an exhaust outlet 152. The light catalytic particles 145 are thereby recovered and passed through a trap output 154 via a light particle conduit 156 into a catalytic particle treatment unit 158 for further processing and recycling of the light catalytic particles 145. Meanwhile, the catalytic particles 144 which comprise the fluidized bed 150 are removed from the reactor 130 via a particle output 148 after an appropriate exposure to reaction conditions within the reactor 130 and enter a cooling/oxidizing chamber 160, wherein an inert cooling gas (such as He). provided at a lower temperature is introduced via a gas inlet 166, thereby cooling the reacted catalytic particles 144. The cooling gas is removed via a gas outlet 168. The catalytic particles 144, having been cooled, can now be exposed to an oxidative gas (such as $O_2$) via the gas inlet 166, wherein amorphous carbon residues on the catalytic particles 144 are removed. Gases are eliminated from the cooling/oxidizing chamber 160 via the gas outlet 168, and the now oxidized catalytic particles 144 leave via an output conduit 162 and pass through a particle conduit 164 into the catalytic particle treatment unit 158. In the catalytic particle treatment unit 158, the catalyst is separated from the support component of the catalytic particles 144 and 145, and the carbon nanotubes are separated from the catalyst by processes previously discussed. The carbon nanotubes are output via a product output 170 for additional purification. The catalyst and support components are transferred via a separation output conduit 172 to a catalyst and support recovery unit 174 wherein the catalyst is recovered, such as by precipitation, and the support is recovered, such as by precipitation, and the catalyst and support are reconstituted in a manner previously described to form catalytic particles 144 which can be reused in the process. The catalytic particles 144 thus recovered are transferred via a feeding conduit 176 back into the reducing/heating chamber 134 for reuse, and may be mixed with fresh catalytic particles 144 which enter via a fresh catalytic particle input 178. As previously explained, the gases used in the apparatus 128 of FIG. 5 are preferably recovered and recycled for use within the apparatus 128.

Effects of Operating Conditions on the Reaction Yield of SWNTs

EXAMPLE 1

Optimal Reaction Conditions

The SWNTs are obtained through the following exemplary exothermic and reversible reaction known as the Boudouard reaction:

This reaction is exothermic with a $\Delta H_R$ of −41,220 cal/mol at 298° C. and an equilibrium constant of 0.047 psi$^{-1}$ at 700° C.

Under the reaction conditions, the Co:Mo catalyst would be expected to deactivate due to different phenomena, such as the formation of the SWNTs themselves, the formation of other carbon species and/or the reduction of the catalyst by the carbon-containing gas.

Since the reaction and the deactivation occur at the same time, in order to maximize the yield of the reaction, it is important to find the conditions under which the formation of the SWNTs is much faster than the deactivation of the catalyst. Many of those conditions are determined by the fact that this reaction is exothermic and reversible.

To calculate the equilibrium conversions under different conditions, the equilibrium constants of the Boudouard reaction were determined at different temperatures using the process simulator software PROVISION /II version 5.0 (from SIMSCI) with the Soave-Redlich-Kwone property package. The properties ($\Delta H_f$, $\Delta G_f$, cp, etc.) of the Graphite were used as the properties of the SWNT. The equilibrium conversion x was then estimated, based on the following definition:

$$x = (F^\circ_{CO} - F_{CO})/F^\circ_{CO} \quad (1)$$

where $F_{CO}$ is the molar flow rate of CO in a continuous reactor when the equilibrium is reached and $F^\circ_{CO}$ is the initial molar flow rate of CO that is fed into the reactor. The equilibrium conversions, obtained in such a reactor at constant pressure and with pure CO in the feed, were obtained solving the following equilibrium equation and stoichiometric balances:

$$Keq = P_{CO_2}/(P_{CO})^2 \quad (2)$$

$$P_{CO} = y_{CO} \cdot P_T = [(1-x)/(\alpha^{-1} - 0.5 \cdot x)] \cdot P \quad (3)$$

$$P_{CO_2} = y_{CO_2} \cdot P_T = [(0.5 \cdot x)/(\alpha^{-1} - 0.5 \cdot x)] \cdot P \quad (4)$$

where $\alpha$ is the molar fraction of CO in the feed stream, $y_{CO}$ and $Y_{CO_2}$ are the molar fractions of CO and $CO_2$ in the gas phase when equilibrium is reached, $P_{CO}$ and $P_{CO_2}$ are the partial pressures of CO and $CO_2$ in equilibrium and $P_T$ is the total pressure under which the reactor operates. Combining equations (1) to (4), the following solution (5) can be obtained:

$$x = (2 \cdot K_{eq} + 0.5 \cdot \alpha^{-1}) - \sqrt{(2 \cdot K_{eq} \cdot P + 0.5 \cdot \alpha^{-1})^2 - K_{eq} \cdot P \cdot (4 \cdot K_{eq} \cdot P + 1)} / (2 \cdot K_{eq} \cdot P + 0.5).$$

Using this equation (5), the equilibrium conversion as a function of temperature and pressure can be readily calculated.

Although high temperatures (above 650° C.) are necessary in order to produce SWNTs with high selectivity, since the reaction is exothermic, the inverse reaction of the nanotube formation increases if the temperature is too high (e.g., above about 850° C.) and the overall reaction rate is lower (the equilibrium of the reaction shifts to the left). For example, $K_{eq}$ is 0.57 psi$^{-1}$ at 600° C., 0.047 psi$^{-1}$ at 700° C., and 0.0062 psi$^{-1}$ at 800° C., and at atmospheric pressure, as illustrated in FIG. 6 the equilibrium conversion of a stream of pure CO is 83% at 600° C., but only 15% at 800° C. and only about 1% at 1000° C.

It is important to note that if the inverse reaction is avoided (e.g., by maintaining a low $CO_2$ concentration), according to the Arrhenius Law, the higher the temperature, the higher the reaction rate. The upper limit for the temperature will be determined in this case by the deactivation of the catalyst due to sintering.

Since the mole number in the gaseous phase is higher in the left term of the equation than in the right term, as pressure increases, overall reaction rate of SWNT production increases, and the equilibrium of the reactions shifts to the right as illustrated in FIG. 6. For instance, if the reaction is carried out isothermically starting with pure CO at 700° C., the conversion of the CO at the equilibrium shifts from 48% to 75% when the pressure is increased from 14.7 psi to 150 psi. However, at higher temperatures, the conversions are very low, and the effect of pressure is less pronounced. Therefore, the pressure needed to keep a moderate equilibrium conversion at temperatures above 800° C. is indeed high. For example, 300 psi are needed to reach 30% conversion at 900° C.

The $CO_2$ produced during the reaction also plays a very important role. Since $CO_2$ is a reaction product, its presence shifts the equilibrium towards the side of the reactants. The $CO_2$ not only dilutes the CO (the reaction gas) but it also increases the importance of the inverse reaction. Both phenomena contribute to a lower reaction rate and can even inhibit the reaction completely if equilibrium conditions are reached. As mentioned above, the effects of $CO_2$ are exacerbated with higher temperature and lower pressure, as well as lower concentration of CO in the feed (as discussed in detail herein below). For example, using equation (5) it can be shown that at 800° C. and 14.7 psi, a CO conversion as low as 14.3% (corresponding to a $CO_2$/CO ratio as low as 0.083) is enough to inhibit the reaction, even if there is no other gas present. Since $CO_2$ is produced during the production of SWNTs, it is important to use high flow rates (high space velocities) of the reactive gas (CO) in order to maintain a low $CO_2$/CO ratio during the process.

Figure 7:
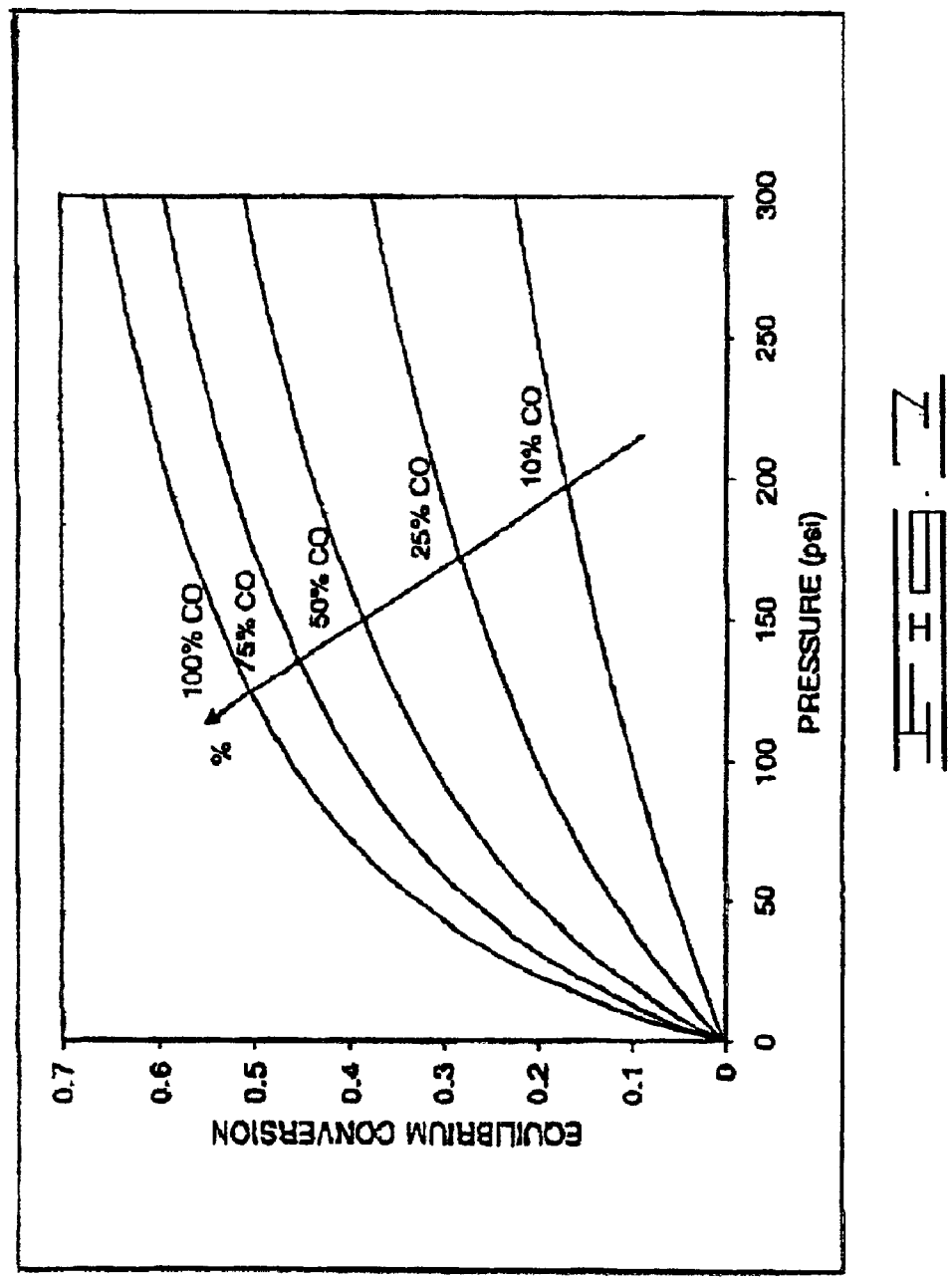
FIG. 7 is a graphic representation of calculated equilibrium conversions of the Boudouard Reaction, in a continuous reactor operating at constant pressure and at a temperature of 800° C., as a function of the total pressure for different inlet concentrations of CO in the range of 10%–100% CO in He.

The presence of an inert gas in the fed stream also may have undesirable effects. It not only decreases the reaction rate by diluting the reaction gas, but it also shifts the equilibrium of the reaction to the left, reducing the overall reaction rate even more due to the effect of the inverse reaction and lowering the overall conversion. FIG. 7 illustrates this trend, showing the conversion in the equilibrium for different CO concentrations in the fed stream when the reaction is carried out isothermically at 800° C. At atmospheric pressure (14.7 psi), for example, the equilibrium conversion shifts from 14.3% when pure CO is used to 1.7% when the concentration of CO is reduced to 10%.

As stated above, the flow rate of the reaction gas (CO) can affect the yield of the reaction. Two factors are important in determining the optimal CO flow rate: the external diffusional effects in the catalyst particle and the conversion of CO to $CO_2$. Since the reaction is exothermic, if the flow rate is not high enough to avoid the external diffusional effects, the real temperature inside the particle may be higher than the temperature in the bulk of the gas phase, and deactivation due to thermal effects (e.g., sintering) may become important. Generally, the changes in concentration in the external layer around the catalyst particles are less pronounced than the temperature profiles. However, with this reaction, they can also be significant due to the net molar flow towards the inside of the particle that is generated during the reaction by the net reduction in the number of moles. This phenomenon would increase the $CO_2$/CO ratio inside the catalyst particle, thus limiting the equilibrium conversion. The second important point is the effect of space velocity on the CO conversion. As mentioned above, in order to reduce the $CO_2$ concentration, high flow rates are required.

Therefore, especially preferred operating conditions are a high reactive gas concentration, a temperature in the range of from about 650° C. to about 950° C., high pressure (above about 70 psi), and a high space velocity (above about 30,000 h$^{-1}$).-

Experimental Verification of Optimal Reaction Conditions

EXAMPLE 2

Catalytic Materials

A Co—Mo catalyst with a Co:Mo molar ratio of 1:3 was prepared by impregnating a silica gel support ($SiO_2$, Aldrich, 70–230 mesh, average pore size 6 nm, BET area 480 $m^2$/g, pore volume 0.75 $cm^3$/g), with aqueous solutions of Cobalt Nitrate and Ammonium Heptamolybdate to obtain the bimetallic catalyst. The liquid/solid ratio was kept at incipient-wetness conditions, which for this support corresponds to 0.63 $cm^3$/g. The total metal content was 6 wt %. After impregnation, the catalysts were first dried in air at room temperature, then in an oven at 120° C., and finally calcined in flowing air at 500° C.

Two batches of catalysts with different particle sizes were prepared using different grounding techniques at the moment of the impregnation. in the first batch, the original particle size of the impregnated support was used (i.e., particle size about 212–62 microns, 70–230 mesh). In the second batch, the particle size was reduced by grinding the particles into a fine powder (i.e., particle size smaller than 75 microns, 200 mesh).

Reaction

The reaction was carried out in three different reactors. The first reactor (a) consisted of a horizontal quartz tube of 1 inch diameter, in which a ceramic boat with 0.5 g of calcined catalyst (powder) was placed. The second reactor (B) and the third reactor (C) were typical quartz fixed-bed reactors of ⅛ and ¼ inch in diameter, respectively. In reactor B, the amount of catalyst used was 0.05 g of the powder form, while in reactor C, the amount was 0.5 g of the 70 mesh material. In all three cases, before reaction the catalysts were heated in $H_2$ up to 500° C. at 8° C./min, maintained under such conditions for 30 minutes and then further heated in He up to 700° C. or 800° C. Subsequently, CO was introduced at the same temperature at varying flow rates. After a given reaction period that ranged from 1 to 120 minutes, the reactor was flushed in He and cooled down to room temperature.

EXAMPLE 3

Characterization of Carbon Deposits

A combination of transmission electron microscopy (TEM), scanning electron microscopy (SEM), Raman Spectroscopy and Temperature Programmed Oxidation (TPO) techniques was used to characterize the carbon species produced during the reaction period. The TEM images were obtained in a JEOL 2000FX-TEM. For these observations, the specimens were prepared by sonicating the samples in isopropanol for 10 minutes and then depositing a few drops of the resulting suspension on a TEM grid. The laser Raman spectra were obtained in a JASCO TRS-600SZ-P single monochromator spectrophotometer, equipped with a CCD (charge-couple device) with the detector cooled to about 153 K with liquid nitrogen. The excitation source was the 514.5 nm line of a Spectra 9000 Photometrics Ar ion laser. The TPO measurements, which also allowed quantification of the amount of the different species of carbon deposited on the catalyst, were conducted by passing a continuous flow (50 $cm^3$/min) of 2% $O_2$ in He over the catalyst containing the carbon deposits while the temperature was linearly increased at a rate of 12° C./min. The $CO_2$ and CO produced during the oxidation was quantitatively converted to methane in a methanator, where the stream coming from the TPO was mixed with a 50 $cm^3$/min stream of $H_2$ over a 15% Ni catalyst supported on γ-$Al_2O_3$ at 400° C. The evolution of the methane produced in the methanator that corresponded to $CO_2$ and CO generated in the TPO was monitored in a SRI model 110 FID. Quantification of the $CO_2$ generated was achieved by calibration with pulses of pure $CO_2$ and oxidation of known amounts of graphite.

EXAMPLE 4

Effects of Flow Rate and CO Concentration

Figure 8:
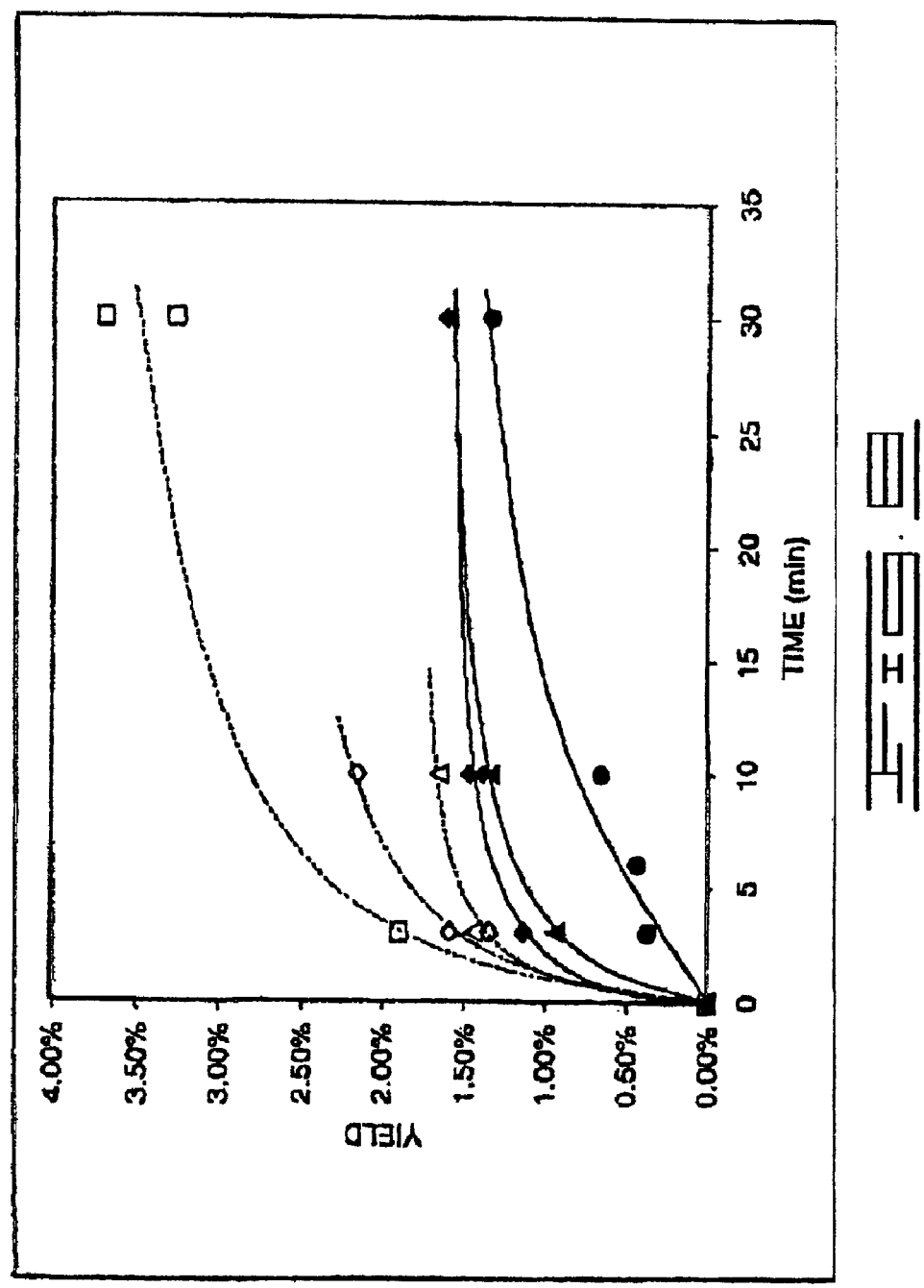
FIG. 8 is a graphic representation of carbon yield as a function of reaction time for different reaction conditions, using the catalyst Co:Mo(1:3)/$SiO_2$ as a fine powder at 700° C. under the following conditions: (•) reaction carried out in reactor A with 100 $cm^3$/min of 50% CO in He; (▲) reaction carried out in reactor B with 50 $cm^3$/min of 50% CO in He; (♦) reaction carried out in reactor B with 100 $cm^3$/min of 50% CO in He; (Δ) reaction carried out in reactor B with 50 $cm^3$/min of 100% CO; (◊) reaction carried out in reactor B with 100 $cm^3$/min of 100% CO; (□) reaction carried out in reactor B with 135 $cm^3$/min of 100% CO.

The experimental results obtained in a series of runs under different conditions verify that indeed the production of SWNT is restricted by the equilibrium of the Boudouard reaction. FIG. 8 shows the variation of carbon yield as measured by the TPO method as a function of time on stream using different flow rates. These runs were conducted in the fixedbed reactor B, which was loaded with 0.05 g of the Co:Mo/$SiO_2$ catalyst and either pure CO or 50% CO in He. Also, a run conducted in the reactor with the ceramic boat inside (reactor A) is included for comparison.

It can be observed that although the final yield is almost the same for all cases in which the concentration of CO is 50%, the initial reaction rate (given by the slopes of the curves at t=0) is much higher for the runs conducted in the fixed-bed reactor than for the runs done in reactor A. When 100% CO was used, the behavior obtained was somewhat different. Not only the initial reaction rates but also the final yields were significantly increased when the flow rate was increased. The reason for such an increase may be one or more of the following three: a) diffusional effects, which are lower when the flow rate is increased; b) effect of the reverse reaction due to lower concentration of $CO_2$ and pressure rise in the system due to the pressure drop developed in the fine-powder catalytic bed.

Figure 9:
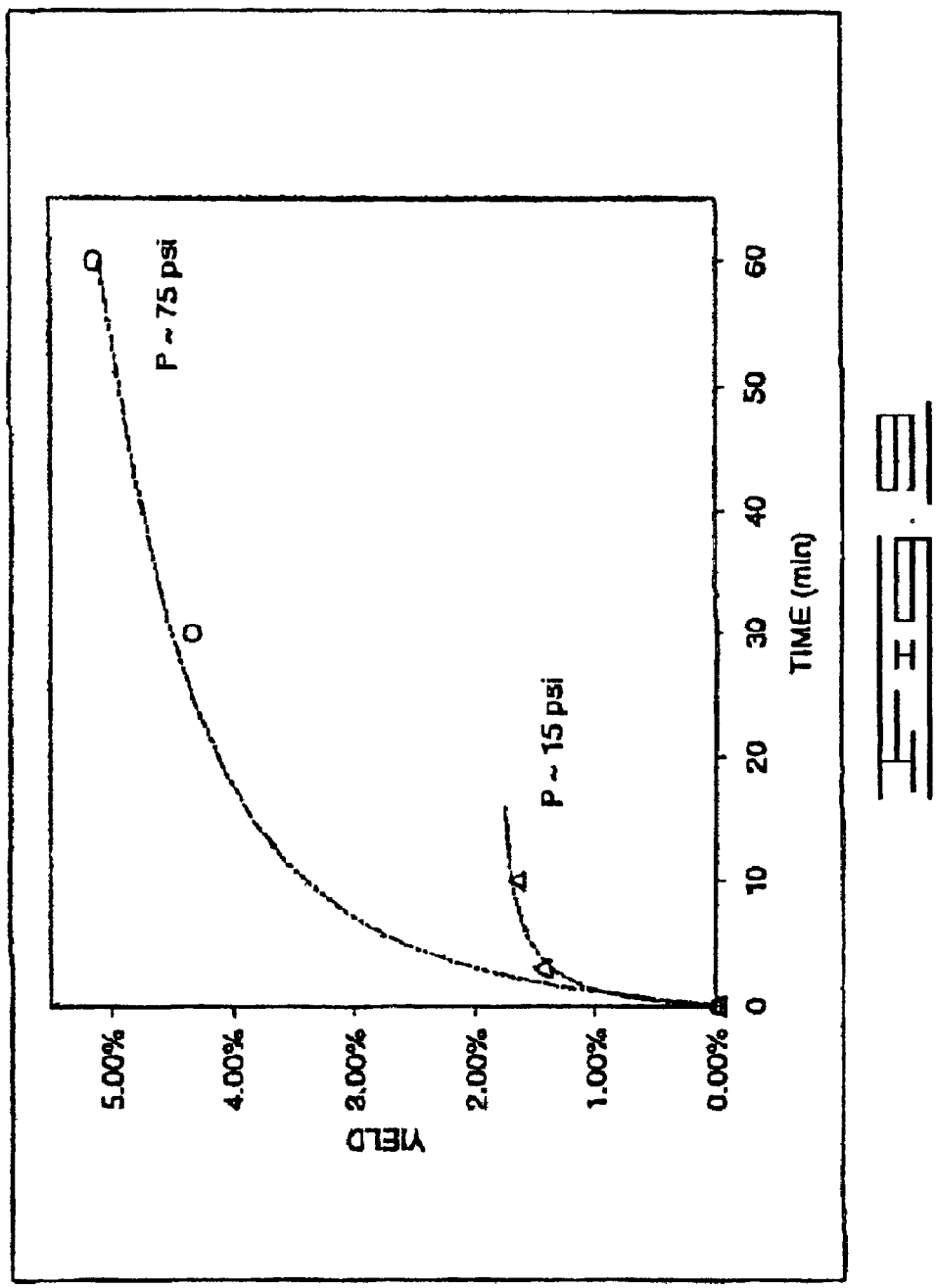
FIG. 9 is a graphic representation of carbon yield as a function of reaction time using reactor B with the catalyst Co:Mo(1:3)/$SiO_2$ as a fine powder and operating at 700° C. with 50 sccm of 100% CO and a pressure in the inlet of the reactor of: (Δ) about 15 psi or (○) about 75 psi.

The effects of external diffusional limitations are clearly seen in the large differences observed between the yields obtained in reactors A and B. The one with the boat inside (reactor A) is likely to have a less uniform flow pattern with stagnant zones than the flow-through fixed bed reactor (reactor B). The influence of pressure was independently investigated by conducting two experiments under the same conditions except for pressure, which was 15 psi for one case and 75 psi for the other. This comparison is made in FIG. 9, which shows that when the pressure increases, both the initial reaction rate and the final yield increase.

EXAMPLE 5

Carbon Profiles Along the Reactor

Figure 10:
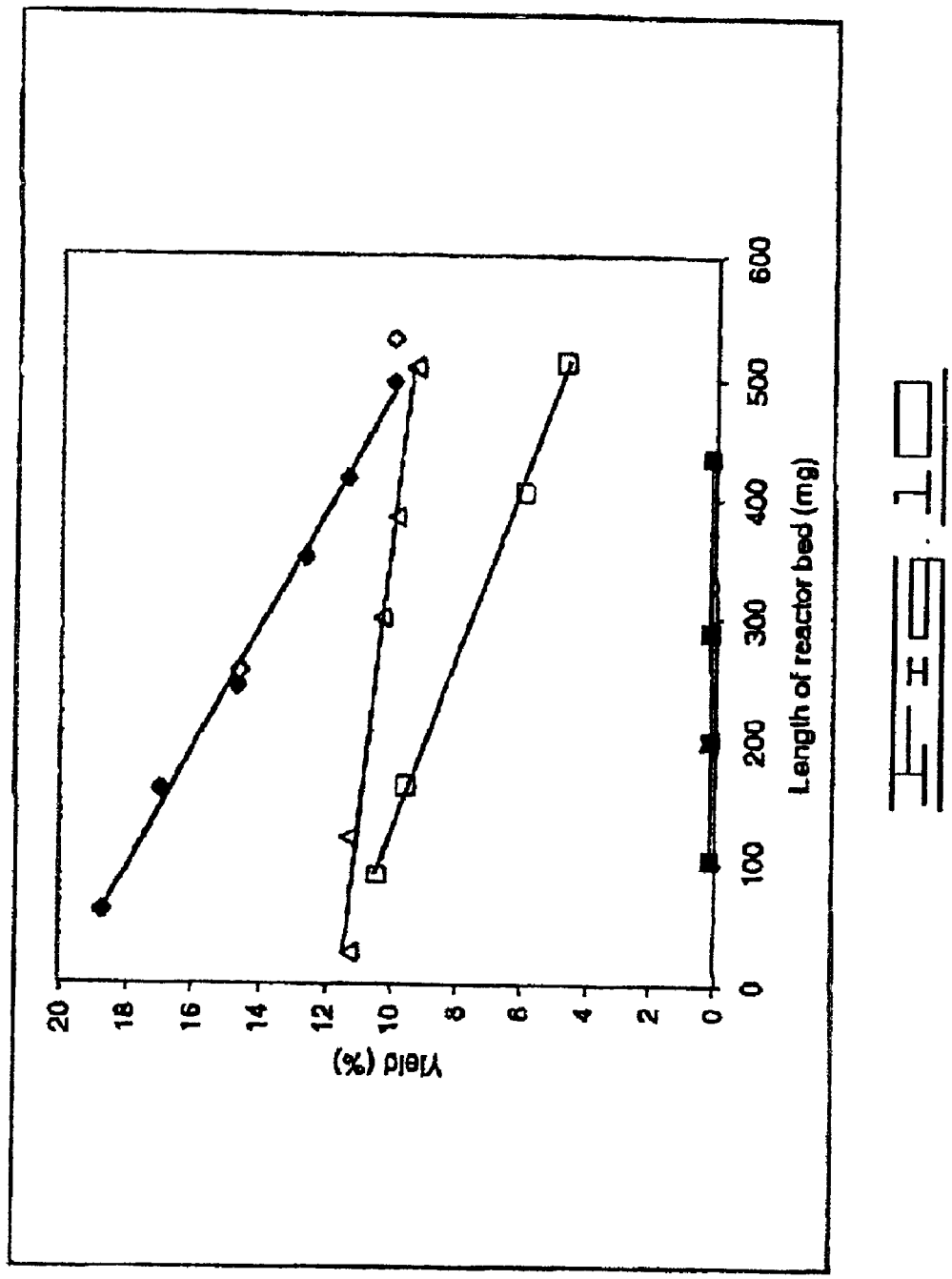
FIG. 10 is a graphic representation of carbon yield along reactor C that is measured by the mass of catalyst from the inlet to the outlet when the reaction is carried out for 120 minutes under a pressure of 85 psi and the following conditions: (♦) 850 sccm of 100% CO, 800° C.; (◊) 850 sccm of 100% CO, 800° C., injecting $CO_2$ for 90 seconds just before starting the reaction; (Δ) 850 sccm of 100% CO, 700° C.; (□) 850 sccm of 50% CO in He, 800° C.; (■) 850 sccm of 50% CO in $CO_2$, 800° C.

Several different runs were conducted in reactor C, which as mentioned above was loaded with a larger amount of catalyst with bigger catalyst particles. Therefore, the flow resistance of the catalytic bed was much lower than when using the powder catalyst, resulting in much lower pressure drop and, consequently, a constant pressure across the catalytic bed. The use of a longer catalyst bed also allowed samples to be taken of products from different parts of the reactor. These data gave important information about the deposition of carbon along the reactor bed at constant pressure, but at increasing CO conversion. The resulting carbon profiles are illustrated in FIG. 10. When the reaction was carried out at 700° C. and 85 psi with a flow rate of 850 $cm^3$/min of pure CO, the yield obtained after two hours of reaction was around 11 wt %, with a selectivity toward SWNT of about 80%. It is interesting to note that the yield was almost constant along the reactor, although the $CO_2$ being formed would inhibit the Boudouard reaction. This result indicates that in this case the total conversion of CO is significantly lower than the equilibrium conversion (about 76% for these conditions), making the effect of the reverse reaction negligible, even during the first moments of the reaction when the reaction rate is higher.

By contrast, when the temperature was increased to 800° C., the yield in the first part of the reactor (where there is no $CO_2$ present) is very high, around 20 wt %, but it decreases along the reactor down to about 11 wt % in the last fraction of the bed. Due to the higher temperature, the rate of the forward reaction, which dominates in the first part of the reactor, is high and leads to high carbon yields. However, as the CO conversion increases along the bed, it reaches the equilibrium conversion, which is around 43% for these conditions, and limits the deposition of carbon. As mentioned above, since the production of carbon occurs only during a short initial time, the catalyst deactivation prevents further accumulation of carbon along the bed.

When the reaction was carried out at 800° C. with 50% CO in He, the yield in the first part of the reactor was only around 11 wt %, significantly lower than the yield obtained with pure CO due to the lower reaction rate caused by the dilution. However, the dilution also shifts the equilibrium conversion, which is around 28% under these conditions. Therefore, the yield along the reactor went down as the CO conversion increased and thermodynamic limitations begun to play a role. In this case, the yield near the end of the reactor was only about 5 wt %.

EXAMPLE 6

Effect of $CO_2$

When the dilution of the feed was done with $CO_2$ instead of He (50% CO in $CO_2$), there was almost no deposition of carbon, and the final yield was constant and around 0.14 wt %. This observation gives strong support to the idea of reversible carbon deposition since a $CO_2/CO$ ratio of 1:1 would correspond to a CO conversion of 66.6% if a pure CO feed were used. The resulting $CO_2$ concentration is higher than that in equilibrium at the reaction conditions, which for a pure CO feed would be about 43%. As a result, thermodynamics predicts that the forward reaction would not occur and no carbon deposition should be expected. To check that the absence of carbon formation was not due to other phenomena, such as catalyst deactivation by $CO_2$, an experiment was performed in which pure $CO_2$ was flowed through the reactor for 90 seconds under the reaction conditions (800° C. at 85 psi) before starting the reaction. As shown in FIG. 10, the yield profile along the reactor was practically the same as the one obtained without the pretreatment in $CO_2$.

It must be noted that in all cases presented herein for which the carbon yield has been increased up to 20 wt %, the selectivity to single wall nanotubes has been very high, as demonstrated by TPO, TEM, SEM and Raman Spectroscopy.

In conclusion, the present invention, in a preferred version, is directed to a process for producing single walled carbon nanotubes. The method comprises the steps of (1) feeding catalytic particles into a reactor, wherein the catalytic particles comprises a support material and a metallic catalyst, and wherein the metallic catalyst is effective in catalyzing the conversion of a carbon-containing gas into single walled carbon nanotubes, (2) removing air from the catalytic particles by exposing the catalytic particles to an inert preheating gas under elevated pressure, (3) reducing the catalytic particles by exposing the catalytic particles to a heated reducing gas under elevated pressure, thereby forming reduced catalytic particles, (4) preheating the reduced catalytic particles to a reaction temperature by exposing the reduced catalytic particles to a reheating gas under elevated pressure, (5) catalytically forming carbon nanotubes by exposing the reduced catalytic particles to a carbon-containing gas heated to the reaction temperature and under a space velocity of 30,000 $h^{-1}$ or higher for a duration of time sufficient to cause catalytic production of single walled carbon nanotubes, thereby forming reacted catalytic particles bearing the single walled carbon nanotubes, (6) flushing the carbon-containing gas from the reacted catalytic particles by exposing the reacted catalytic particles to a heated post reaction gas under elevated pressure, (7) cooling the reacted catalytic particles by exposing the reacted catalytic particles to a moderate temperature cooling gas under elevated pressure, (8) removing amorphous carbon deposited on the reacted catalytic particles by exposing the reacted catalytic particles to a heated $O_2$-containing gas under elevated pressure, thereby oxidizing the amorphous carbon and forming semi-purified catalytic particles, (9) treating the semi-purified catalytic particles to separate the support material from the catalyst, (10) treating the catalyst with a solvent to dissolve the metallic catalyst, thereby separating the single walled carbon nanotubes from the catalyst, (11) recovering the support material by precipitation, (12) recovering the catalyst by precipitation, (13) combining the recovered support material and the recovered catalyst, (14) impregnating the catalyst onto the support material to regenerate the catalytic particles, and (15) feeding the regenerated catalytic particles into the reactor. The process may be a continuous flow process.

The metallic catalyst of the catalytic particles may be a Co—Mo catalyst having a Co—Mo molar ratio in the range of from about 1:2 to about 1:4. The support material of the catalyst may be $SiO_2$, $Al_2O_3$, MgO, $ZrO_2$, zeolites, MCM-41, or Mg(Al)O, and is preferably $SiO_2$.

The process may further comprise the step of calcining and pelletizing the support material before or after the support material is impregnated with the catalyst.

Each gas may have a gas flow rate which can be controlled independently of a flow rate of the catalytic particles. In the process the elevated pressure may be defined as a pressure above about 70 psi. The preheating gas may be He, Ar, $N_2$, other inert gases and mixtures thereof, and may have a temperature in the range of from about 500° C. to about 1200° C., or more particularly, about 700° C. to about 1000° C., and more preferably about 750° C. to about 950° C.

The reducing gas may be $H_2$, $NH_3$, $CH_4$ and mixtures thereof, and have a temperature in the range of from about 400° C. to about 800° C., or more particularly, about 500° C.

The reheating gas may be He, Ar, $N_2$, other inert gases, and mixtures thereof, and may have a temperature in the range of from about 600° C. to about 1200° C., and more particularly, about 750° C. to about 950° C.

The carbon-containing gas may be carbon monoxide, methane, ethane, propane, butane, hexane, ethylene, propylene, acetone, methanol, toluene, benzene, napthalene, and mixtures thereof.

Where the carbon-containing gas is carbon monoxide, the concentration may be in the range of from about 50% to about 100%.

The reaction temperature may be in a range of from about 700° C. to about 1000° C., or more particularly, about 750° C. to about 950° C.

Preferably, the carbon-containing gas is provided at a high space velocity to minimize $CO_2$ concentration, and particularly is above about 30,000 $h^{-1}$.

The post reaction gas may be He, Ar, $N_2$, other inert gases, and mixtures thereof, and may have a temperature of in the range of from about 300° C. to about 900° C., and preferably about 750° C.

The cooling gas may be He, Ar, $N_2$, other inert gases, and mixtures thereof, and may have a temperature in the range of from about 0° C. to about 300° C., and preferably about 22° C.

The percentage of $O_2$ in the $O_2$-containing gas may be in the range of from about 2% to about 5%, and may have a temperature in the range of from about 280° C. to about 320° C., and more particularly, about 300° C.

The process may comprise the step of recycling the carbon-containing gas removed from the reactor after the catalysis step and reusing the carbon-containing gas in the catalysis step, recovering the preheating gas, the reducing gas, the reheating gas, the carbon-containing gas, the post reaction gas, the cooling gas, and the $O_2$-containing gas after their exit from the reactor, purifying each of said gases, and reusing each of said gases in the reactor. And in the step of combining the recovered support material and the recovered catalyst, additional support material and/or catalyst may be added before regenerating the catalytic particles.

Changes may be made in the construction and the operation of the various components, elements and assemblies described herein or in the steps or the sequence of steps of the processes described herein without departing from the spirit and scope of the invention as defined herein.

What is claimed is:

1. A process for producing single-walled carbon nanotubes, comprising:
    disposing catalytic particles into a reactor wherein the catalytic particles comprise a support-material and a catalytic material, the catalytic particles effective in catalyzing the conversion of a carbon-containing gas into single-walled carbon nanotubes;
    removing air from the catalytic particles by exposing the catalytic particles to a heated inert gas;,
    reducing the catalytic particles by exposing the catalytic particles to a heated reducing gas forming reduced catalytic particles; and
    catalytically forming single-walled carbon nanotubes by exposing the reduced catalytic particles to a carbon-containing gas for a duration of time and at a temperature sufficient to cause catalytic production of single-walled carbon nanotubes thereby forming reacted catalytic particles bearing the single-walled carbon nanotubes.

2. The process of claim 1 wherein the catalytic material comprises cobalt and molybdenum.

3. The method process of claim 1 wherein the inert gas comprises a gas selected from the group consisting of He, Ar, and $N_2$.

4. The method process of claim 1 wherein the carbon-containing gas comprises a gas selected from the group consisting of CO, $CH_4$, $C_2H_4$, $C_2H_2$, or mixtures thereof.

5. The method process of claim 1 wherein the support material is selected from the group consisting of $SiO_2$, $Al_2O_3$, MgO, $ZrO_2$, zeolites, MCM-41, and Mg(Al)O.

6. The method process of claim 1 wherein the catalytic material comprises at least one of the metals selected from the group consisting of Co, Mo, Ni, Fe, W, or Nb.

7. The method process of claim 1 wherein the catalytic material comprises a Group VIII metal selected from the group consisting of Co, Ni, Ru, Rh, Pd, Ir, Fe, Pt, and mixtures thereof, and a Group VIb metal selected from the group consisting of Cr, Mo, W, and mixtures thereof and/or a Group Vb metal selected from the group consisting of V, Nb and Ta, and mixtures thereof.

8. The process of claim 1 wherein the reaction temperature is about 700° C. to about 1000° C.

9. The process of claim 1 wherein the reaction temperature is about 750° C. to about 950° C.

10. The process of claim 1 wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon.

11. The process of claim 10 wherein the carbon-containing gas further comprises a diluent gas.

12. A process for producing single-walled carbon nanotubes, comprising:
    disposing catalytic particles into a reactor wherein the catalytic particles comprise a support material and a catalytic material, the catalyst effective in catalyzing the conversion of a carbon-containing gas into carbon nanotubes;
    treating the catalytic particles with a reduction process;
    heating the catalytic particles to a reaction temperature; and
    catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes.

13. The process of claim 12 wherein the catalytic material comprises cobalt and molybdenum.

14. The process of claim 12 wherein the step of heating the catalytic particles comprises exposing the catalytic particles to a heated inert gas.

15. The process of claim 12 further comprising the step of flushing the carbon-containing gas from the reacted catalytic particles.

16. The process of claim 12 further comprising the step of cooling the reacted catalytic particles.

17. The process of claim 12 further comprising the step of removing amorphous carbon from the reacted catalytic particles and treating the reacted catalytic particles to obtain the single-walled carbon nanotubes.

18. The process of claim 12 wherein the catalytic material is a metallic catalyst.

19. The process of claim 12 wherein the reaction temperature is about 700° C. to about 1000° C.

20. The process of claim 12 wherein the reaction temperature is about 750° C. to about 950° C.

21. The process of claim 12 wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon.

22. The process of claim 12 wherein the carbon-containing gas further comprises a diluent gas.

23. The process of claim 12 comprising the additional step of treating the reacted catalytic particles to obtain the single-walled carbon nanotubes.

24. A process for producing single-walled carbon nanotubes, comprising:
   disposing catalytic particles into a reactor wherein the catalytic particles comprise a support material and a catalytic material comprising Co and Mo;
   heating the catalytic particles to a reaction temperature wherein the reaction temperature is about 750° C. to about 950° C.; and
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes.

25. A process for producing single-walled carbon nanotubes, comprising:
   disposing catalytic particles into a reactor wherein the catalytic particles comprise a support material and a catalytic material;
   treating the catalytic particles with a reduction process;
   heating the catalytic particles to a reaction temperature wherein the reaction temperature is about 750° C. to about 950° C.; and
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes.

26. A process for producing single-walled carbon nanotubes, comprising:
   disposing catalytic particles into a reactor wherein the catalytic particles comprise a support material and a catalytic material;
   heating the catalytic particles to a reaction temperature wherein the reaction temperature is about 750° C. to about 950° C., and
   wherein the catalytic particles are heated by exposing the catalytic particles to a heated inert gas; and
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes.

27. A process for producing single-walled carbon nanotubes, comprising:
   disposing catalytic particles into a reactor wherein the catalytic particles comprise a support material and a catalytic material;
   heating the catalytic particles to a reaction temperature wherein the reaction temperature is about 750° C. to about 950° C.;
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes; and
   flushing the carbon-containing gas from the reacted catalytic particles.

28. A process for producing single-walled carbon nanotubes, comprising:
   disposing catalytic particles into a reactor wherein the catalytic particles comprise a support material and a catalytic material;
   heating the catalytic particles to a reaction temperature wherein the reaction temperature is about 750° C. to about 950° C.;
   catalytically forming single-walled carbon nanotubes by exposing the catalytic particles to a, carbon-containing gas for a duration of time and at a temperature sufficient to cause catalytic production of the single-walled carbon nanotubes thereby forming reacted catalytic particles bearing the single-walled carbon nanotubes; and
   removing amorphous carbon from the reacted catalytic particles to obtain the single-walled carbon nanotubes.

29. A process for producing single-walled carbon nanotubes, comprising:
   disposing catalytic particles into a reactor wherein the catalytic particles comprise a support material and a catalytic material;
   heating the catalytic particles to a reaction temperature wherein the reaction temperature is about 750° C. to about 950° C.; and
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, wherein the carbon-containing gas further comprises a diluent gas.

30. A process for producing single-walled carbon nanotubes, comprising:
   disposing catalytic particles into a reactor wherein the catalytic particles comprise a support material and a catalytic material;
   heating the catalytic particles to a reaction temperature wherein the reaction temperature is about 750° C. to about 950° C.;
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes; and
   treating the reacted catalytic particles to obtain the single-walled carbon nanotubes.

31. A process for producing single-walled carbon nanotubes, comprising:
   disposing catalytic particles into a reactor wherein the catalytic particles comprise a support material and a catalytic material comprising Co and Mo;
   heating the catalytic particles to a reaction temperature; and
   catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon.

32. A process for producing single-walled carbon nanotubes, comprising:
- disposing catalytic particles into a reactor wherein the catalytic particles comprise a support material and a catalytic material;
- treating the catalytic particles with a reduction process;
- heating the catalytic particles to a reaction temperature; and
- catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon.

33. A process for producing single-walled carbon nanotubes, comprising:
- disposing catalytic particles into a reactor wherein the catalytic particles comprise a support material and a catalytic material;
- heating the catalytic particles to a reaction temperature by exposing the catalytic particles to a heated inert gas; and
- catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon.

34. A process for producing single-walled carbon nanotubes, comprising:
- disposing catalytic particles into a reactor wherein the catalytic particles comprise a support material and a catalytic material;
- heating the catalytic particles to a reaction temperature; and
- catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol and/or an aromatic hydrocarbon, and flushing the carbon-containing gas from the reacted catalytic particles.

35. A process for producing single-walled carbon nanotubes, comprising:
- disposing catalytic particles into a reactor wherein the catalytic particles comprise a support material and a catalytic material;
- heating the catalytic particles to a reaction temperature;
- catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon; and
- removing amorphous carbon from the reacted catalytic particles and treating the reacted catalytic particles to obtain the single-walled carbon nanotubes.

36. A process for producing single-walled carbon nanotubes, comprising:
- disposing catalytic particles into a reactor wherein the catalytic particles comprise a support material and a catalytic material;
- heating the catalytic particles to a reaction temperature; and
- catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon and wherein the carbon-containing gas further comprises a diluent gas.

37. A process for producing single-walled carbon nanotubes, comprising:
- disposing catalytic particles into a reactor wherein the catalytic particles comprise a support material and a catalytic material;
- heating the catalytic particles to a reaction temperature;
- catalytically forming single-walled carbon nanotubes by exposing the catalytic particles to a carbon-containing gas for a duration of time and at a temperature sufficient to cause catalytic production of the single-walled carbon nanotubes thereby forming reacted catalytic particles bearing the single-walled carbon nanotubes, and wherein the carbon-containing gas comprises carbon monoxide, a saturated aliphatic hydrocarbon, an unsaturated aliphatic hydrocarbon, an oxygenated hydrocarbon, an alcohol, and/or an aromatic hydrocarbon; and treating the reacted catalytic particles to obtain the single-walled carbon nanotubes.

* * * * *

UNITED STATES PATENT AND TRADEMARK OFFICE
CERTIFICATE OF CORRECTION

PATENT NO. : 6,919,064 B2 Page 1 of 1
APPLICATION NO. : 09/996142
DATED : July 19, 2005
INVENTOR(S) : Daniel E. Resasco et al.

It is certified that error appears in the above-identified patent and that said Letters Patent is hereby corrected as shown below:

Column 2, Line 8: Delete "120°C" and replace with --1200°C--.

Column 4, Line 66: Delete the "comma" after the word "the" and before the word "catalytic".

Column 15, Line 15: Delete "$\Delta G_f$" and replace with --$\Delta Gf$--

Column 15, Line 43: Delete the formula "$x = (2 \cdot K_{eq} + 0.5 \cdot \alpha^1)$"

$$\sqrt{(2K_{eq}P+0.5 \cdot \alpha^1)^2 - K_{eq}P(4K_{eq}P+1)} / (2K_{eq}P+0.5)."$$

and replace with the formula, $$-x = (2K_{eq}P+0.5 \cdot \alpha^{-1}) - \sqrt{(2K_{eq}P+0.5 \cdot \alpha^{-1})^2 - K_{eq}P(4K_{eq}P+1)} / (2K_{eq}P+0.5). --$$

Signed and Sealed this

Twenty-first Day of November, 2006

JON W. DUDAS
*Director of the United States Patent and Trademark Office*